(12) United States Patent
Searle et al.

(10) Patent No.: US 6,198,984 B1
(45) Date of Patent: Mar. 6, 2001

(54) LIBRARY FOR STORING DATA-STORAGE MEDIA AND HAVING AN IMPROVED MEDIA TRANSPORTER

(75) Inventors: Nathan H. Searle, Snohomish; Allen E. Fleckenstein, Bellevue, both of WA (US)

(73) Assignee: Advanced Digital Information Corporation, Redmond, WA (US)

( * ) Notice: Subject to any disclaimer, the term of this patent is extended or adjusted under 35 U.S.C. 154(b) by 0 days.

(21) Appl. No.: 09/062,662

(22) Filed: Apr. 17, 1998

(51) Int. Cl.[7] ............................... G06F 17/00; G06F 7/00
(52) U.S. Cl. ......................... 700/213; 700/170; 700/173; 700/214
(58) Field of Search ................................. 700/213, 214, 700/173, 170

(56) References Cited

U.S. PATENT DOCUMENTS

| | | | |
|---|---|---|---|
| 3,809,263 | 5/1974 | Dodd et al. | 214/16.4 |
| 3,831,197 | 8/1974 | Beach et al. | 360/71 |
| 3,940,675 | * 2/1976 | Schroeder | 318/603 |
| 4,519,522 | * 5/1985 | McElwee | 221/13 |
| 4,654,727 | 3/1987 | Blum et al. | 360/71 |
| 4,779,151 | 10/1988 | Lind et al. | 360/92 |
| 4,802,035 | * 1/1989 | Ohtsuka | 360/92 |
| 4,816,943 | 3/1989 | Tanaka et al. | 360/92 |
| 4,817,070 | * 3/1989 | Hug et al. | 369/36 |
| 4,864,511 | 9/1989 | Moy et al. | 364/478 |

(List continued on next page.)

FOREIGN PATENT DOCUMENTS

| | | | |
|---|---|---|---|
| 3612531 | 11/1986 | (DE) | 360/92 |
| 0 392 620 A2 | * 10/1990 | (DE) . | |
| 0 186 945 | 5/1986 | (EP) . | |
| 0 392 620 | 10/1990 | (EP) | 360/92 |
| 61-92467 | 5/1986 | (JP) | 360/92 |

(List continued on next page.)

Primary Examiner—Ayaz R. Sheikh
Assistant Examiner—Frantz Blanchard Jean
(74) Attorney, Agent, or Firm—Seed IP Law Group PLLC

(57) ABSTRACT

A library for storing a cartridge of data-storage media includes a chassis and includes cartridge slots, a media drive, a cartridge transporter having a cam mechanism, and transporter and cam drive assemblies all located within the chassis. The cartridge slots each have an outer slot opening that faces outward of the chassis and an inner slot opening that faces inward of the chassis, and each slot allows insertion and removal of the cartridge through both of the respective inner and outer slot openings. The media drive has a cartridge opening that faces the inner slot openings and receives and ejects the cartridge via this opening. The cartridge transporter is located between the slots and the media drive and includes a first transporter opening that faces the slots, a second transporter opening that faces the drive, a cartridge passage that extends between the first and second transporter openings, a first roller arm that is located at a side thereof toward the first transporter opening, a second roller arm that is located at a side thereof toward the second transporter opening, a cam mechanism that moves the first and second roller arms, and a roller mechanism that includes respective first and second rollers mounted to the first and second roller arms and that moves the cartridge through the cartridge passage. The transporter drive assembly moves the cartridge transporter to align the first transporter opening with the inner slot opening of a selected slot or to align the second transporter opening with the cartridge opening of the media drive. The cam drive assembly moves the cam mechanism to cause the first roller of the first roller arm to engage the cartridge while the first roller moves the cartridge between the cartridge transporter and the selected slot, or to cause the second roller of the second roller arm to engage the cartridge while the second roller moves the cartridge between the cartridge transporter and the media drive. The library also includes a circuit that controls the operation of the transporter and cam drive assemblies.

30 Claims, 12 Drawing Sheets

U.S. PATENT DOCUMENTS

| | | | |
|---|---|---|---|
| 4,945,429 | | 7/1990 | Munro et al. ............................ 360/92 |
| 4,984,106 | * | 1/1991 | Herger et al. ........................... 360/92 |
| 5,016,127 | | 5/1991 | Inoue et al. ............................ 360/92 |
| 5,089,920 | * | 2/1992 | Bryer et al. ............................ 360/92 |
| 5,157,564 | | 10/1992 | Theabold et al. ...................... 360/92 |
| 5,182,687 | * | 1/1993 | Campbell et al. ..................... 360/92 |
| 5,235,474 | | 8/1993 | Searle .................................... 360/71 |
| 5,258,882 | | 11/1993 | Apple et al. ........................... 360/92 |
| 5,291,110 | | 3/1994 | Andrews, Jr. et al. ............... 318/560 |
| 5,481,514 | | 1/1996 | Yamasaki et al. ..................... 369/36 |
| 5,515,139 | * | 5/1996 | Hou et al. ............................. 355/208 |
| 5,781,367 | * | 7/1998 | Searle et al. ........................... 360/92 |

FOREIGN PATENT DOCUMENTS

| | | |
|---|---|---|
| 62-239370 | 10/1987 | (JP) ........................................ 360/92 |
| 62-239372 | 10/1987 | (JP) ........................................ 360/92 |
| 62-239460 | 10/1987 | (JP) ........................................ 360/92 |
| 63-244440 | 10/1988 | (JP) . |
| 2-42672 | 2/1990 | (JP) ........................................ 360/92 |
| 3-44858 | 2/1991 | (JP) ........................................ 360/92 |
| 3-91153 | 4/1991 | (JP) ........................................ 360/92 |
| 4-10264 | 1/1992 | (JP) ........................................ 360/92 |
| 4-163761 | 6/1992 | (JP) ........................................ 360/92 |
| 5-144144 | 6/1993 | (JP) ........................................ 360/92 |

* cited by examiner

LIBRARY FOR STORING DATA-STORAGE MEDIA AND HAVING AN IMPROVED MEDIA TRANSPORTER

CROSS-RELATED APPLICATIONS

This is related to an application entitled "AN IMPROVED DOOR HINGE" filed Apr. 17, 1998, and assigned U.S. patent application Ser. No. 09/062,546, and an application entitled "LIBRARY FOR STORING DATA-STORAGE MEDIA AND HAVING A REMOVABLE INTERFACE MODULE" filed Apr. 17, 1998, and assigned U.S. patent application Ser. No. 09/062,522.

TECHNICAL FIELD

The invention relates generally to electromechanical devices, and more specifically to a library for storing cartridges of data-storage media, such as magnetic tape, and for providing read/write access to the stored media.

BACKGROUND OF THE INVENTION

Because today's computer users often store large volumes of information on computer systems, it has become increasingly more important to backup this information to non-volatile storage media, such as magnetic tape or CD-ROM (Compact-Disc Read-Only Memory), and to archive this media so that the stored information can be easily retrieved. Furthermore, as the amount of a user's backed-up data increases, he often archives the storage media with the aid of a computer to reduce inventory errors or other errors that may occur when the storage media are manually archived.

One type of device that is often used to archive data-storage media is a data storage library. Typically, the library is interfaced to a host computer system, and includes a media drive for reading data from and writing data to the storage media, a section for archiving the storage media, a section where an operator can load and unload the storage media, and a mechanism for transporting the storage media among the load/unload section, the archive section, and the drive. By communicating with or controlling the library, the host computer system can keep track of the specific information stored on a particular storage medium and where in the library the particular storage medium is located. Thus, when one wishes to retrieve specific archived information, the host computer can control the transport mechanism to retrieve the storage medium containing the specific information and to insert the storage medium into the media drive so that the computer can access the information.

A problem with such data storage libraries is that the on-board transport mechanism often requires a relatively large operating space, and thus significantly reduces the amount of space available for media storage.

Furthermore, in today's highly computerized environment, there are many interface protocols and formats, including SCSI, fiber-channel, and ultra-wide interfaces. Therefore, a manufacturer often must make costly and complex modifications to a library so that it can properly interface with a customer's computer system. Alternatively, the manufacturer can produce different versions of the library, one version for each interface protocol and format. But this also significantly increases overall manufacturing costs.

Additionally, many computer users want a storage library to be rack-mountable so that it can be used to archive information from an entire computer network. But many libraries cannot be rack mounted because they are not properly sized to fit within the standard rack space or because parts of the library, such as an open door, will encroach on the rack space occupied by a component mounted next to the library. Furthermore, many of the libraries that are rack-mountable use the allotted rack space inefficiently. For example, such libraries may utilize the full width of the rack space but not the full depth. Moreover, many users want the storage library to be mountable within a fraction of a standard rack width but to still have a relatively large information storage capacity.

SUMMARY OF THE INVENTION

In accordance with one aspect of the invention, a library is provided for storing a cartridge of data-storage media. The library includes a chassis and includes cartridge slots, a media drive, a cartridge transporter having a cam mechanism, and transporter and cam drive assemblies all located within the chassis. The cartridge slots each have an outer slot opening that faces outward of the chassis and an inner slot opening that faces inward of the chassis, and each slot allows insertion and removal of the cartridge through both of the respective inner and outer slot openings. The media drive has a cartridge opening that faces the inner slot openings and receives and ejects the cartridge via this opening. The cartridge transporter is located between the slots and the media drive and includes a first transporter opening that faces the slots, a second transporter opening that faces the drive, a cartridge passage that extends between the first and second transporter openings, a first roller arm that is located at a side thereof toward the first transporter opening, a second roller arm that is located at a side thereof toward the second transporter opening, a cam mechanism that moves the first and second roller arms, and a roller mechanism that includes a first roller mounted to the first roller arm and a second roller mounted to the second roller arm and that moves the cartridge through the cartridge passage. The transporter drive assembly moves the cartridge transporter to align the first transporter opening with the inner slot opening of a selected slot or to align the second transporter opening with the cartridge opening of the media drive. The cam drive assembly moves the cam mechanism to cause the first roller of the first roller arm to engage the cartridge while the first roller moves the cartridge between the cartridge transporter and the selected slot, or to cause the second roller of the second roller arm to engage the cartridge while the second roller moves the cartridge between the cartridge transporter and the media drive. The library also includes a circuit that controls the operation of the transporter and cam drive assemblies.

Such a transporter requires significantly less operating space than conventional transporters. Thus, for a given size, such a storage library has a significantly greater storage capacity than many conventional libraries. Furthermore, such a transporter allows a library to be sized for more efficient use of rack space by allowing the library to occupy the full rack depth. Additionally, such a transporter also allows a library to have a width that is a fraction of a rack width. Moreover, because the transporter allows a library to utilize the full rack depth, a library having a fractional rack width can still have a relatively large data-storage capacity.

DETAILED DESCRIPTION OF THE INVENTION

Figure 1:
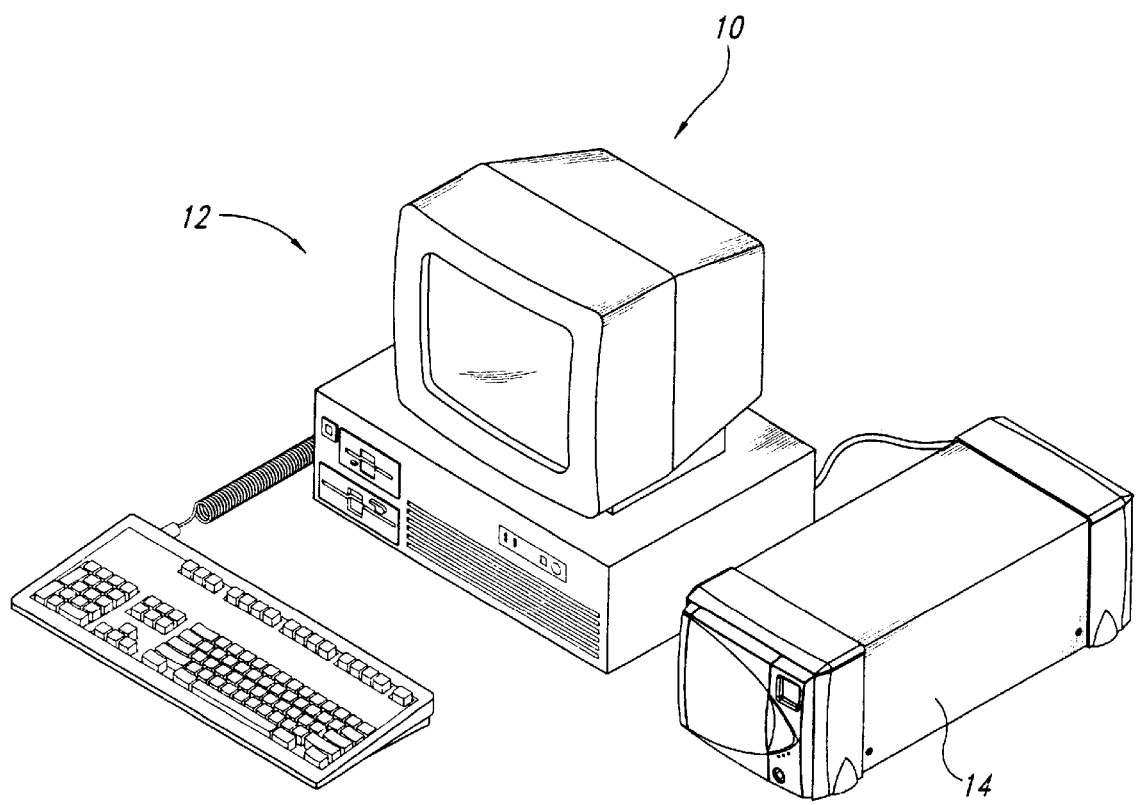
FIG. 1 is an isometric view of a computer system including a host computer coupled to a storage library that is in accordance with one aspect of the invention.
Figure 7:
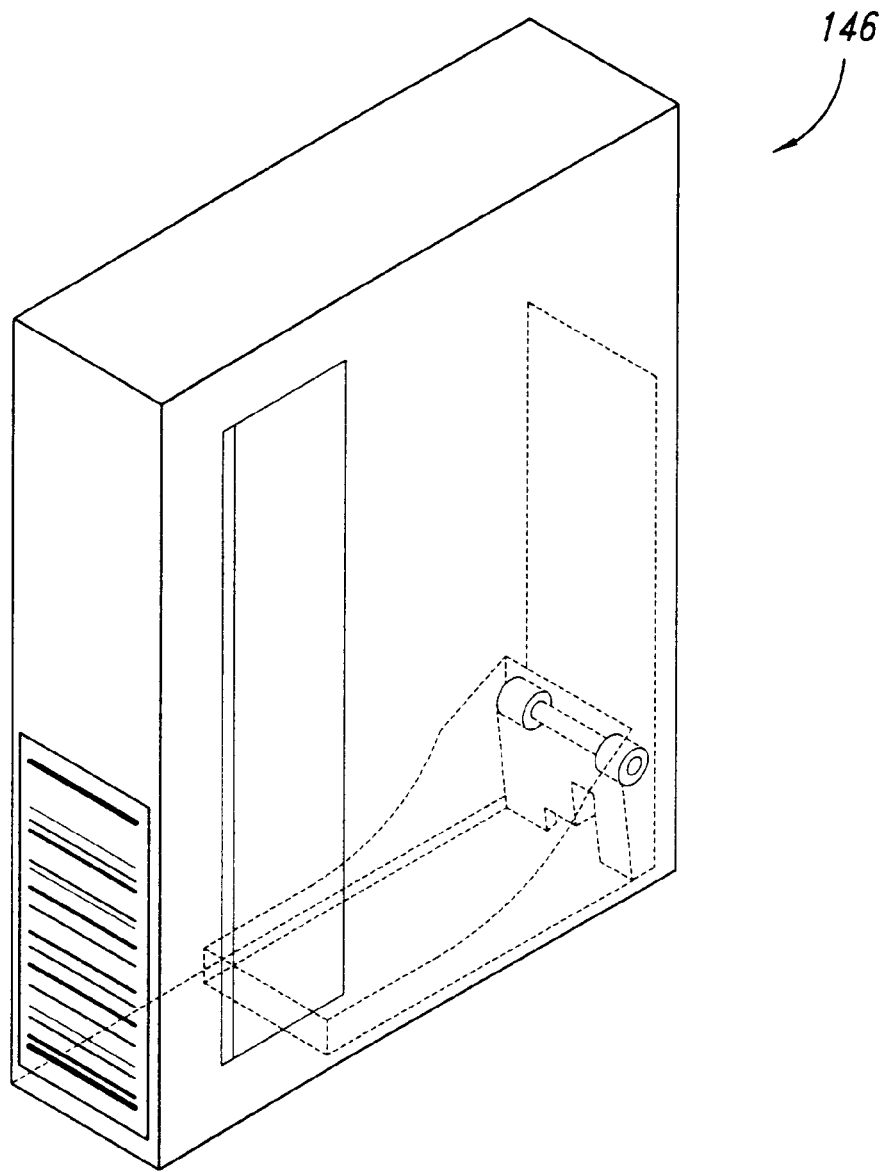
FIG. 7 is an enlarged, isometric view of a digital-linear-tape (DLT) cartridge that can be stored by one embodiment of the storage library of FIG. 1.

A computer system 10, which includes a conventional host computer 12 and an embodiment of a data storage library 14 according to the present invention, is shown in FIG. 1. The library 14 communicates with the computer 12 and allows the computer 12 to archive data to and retrieve data from one or more data storage media (such as shown in FIG. 7) such as magnetic-tape cartridges or CD-ROMs. Under control of the computer 12, the library 14 receives data from the computer 12, records the received data onto a storage medium, and then archives the storage medium in a particular location within the library 14. To later access this data, the computer 12 instructs the library 14 to retrieve the storage medium from the particular location, to read the data from the medium, and to route the read data back to the computer 12. If the computer system 10 is part of a larger computer network, then the computer 12 can be configured to allow other network components (not shown in FIG. 1), such as file servers or other computers, to archive data to and retrieve data from the library 14. Furthermore, although shown coupled to the computer 12 in a desktop configuration, the library 14 may be rack mounted and connected to a network component other than the computer 12.

Figure 2:
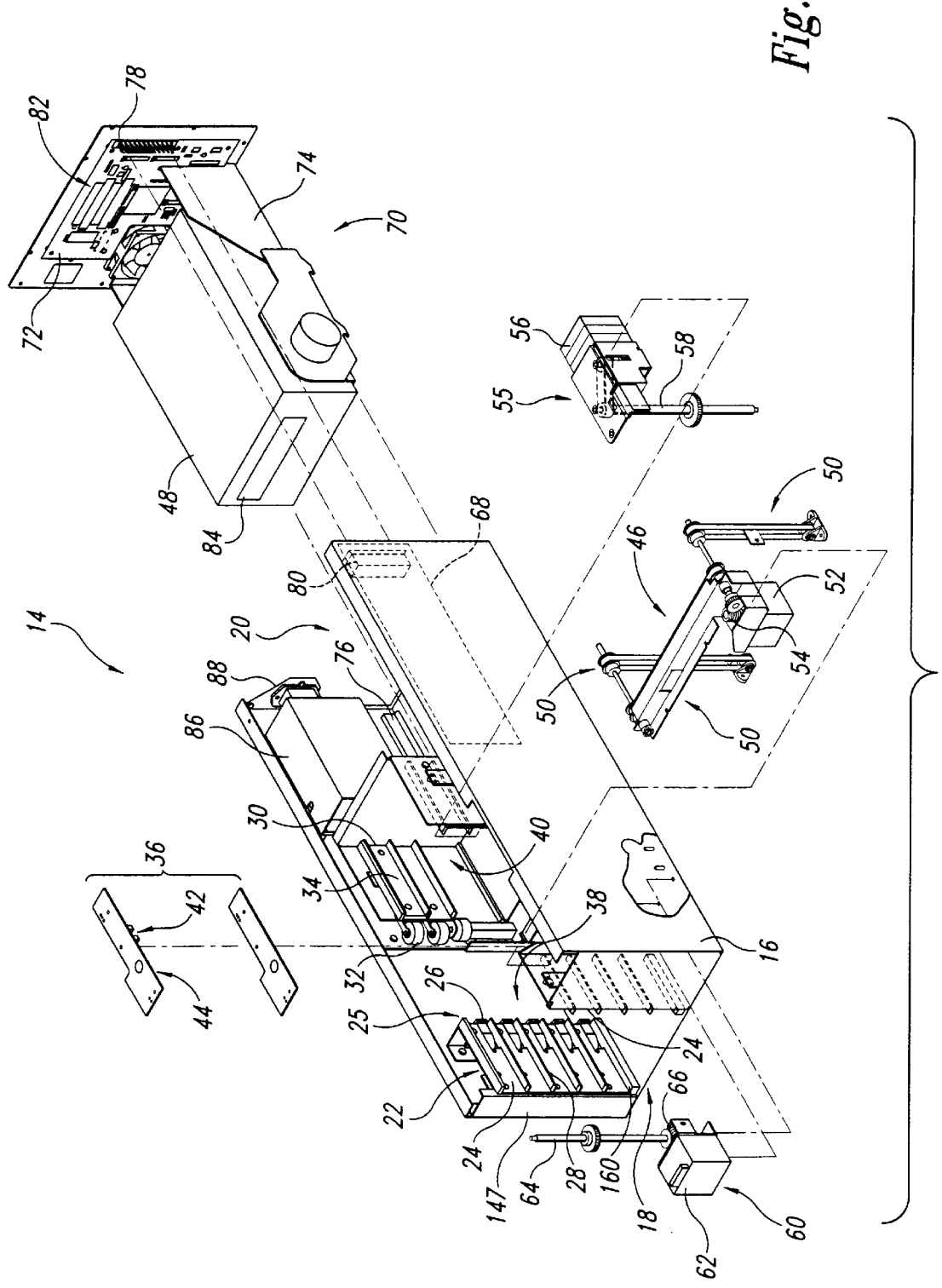
FIG. 2 is an enlarged, exploded isometric view of portions of the storage library of FIG. 1.
Figure 8:
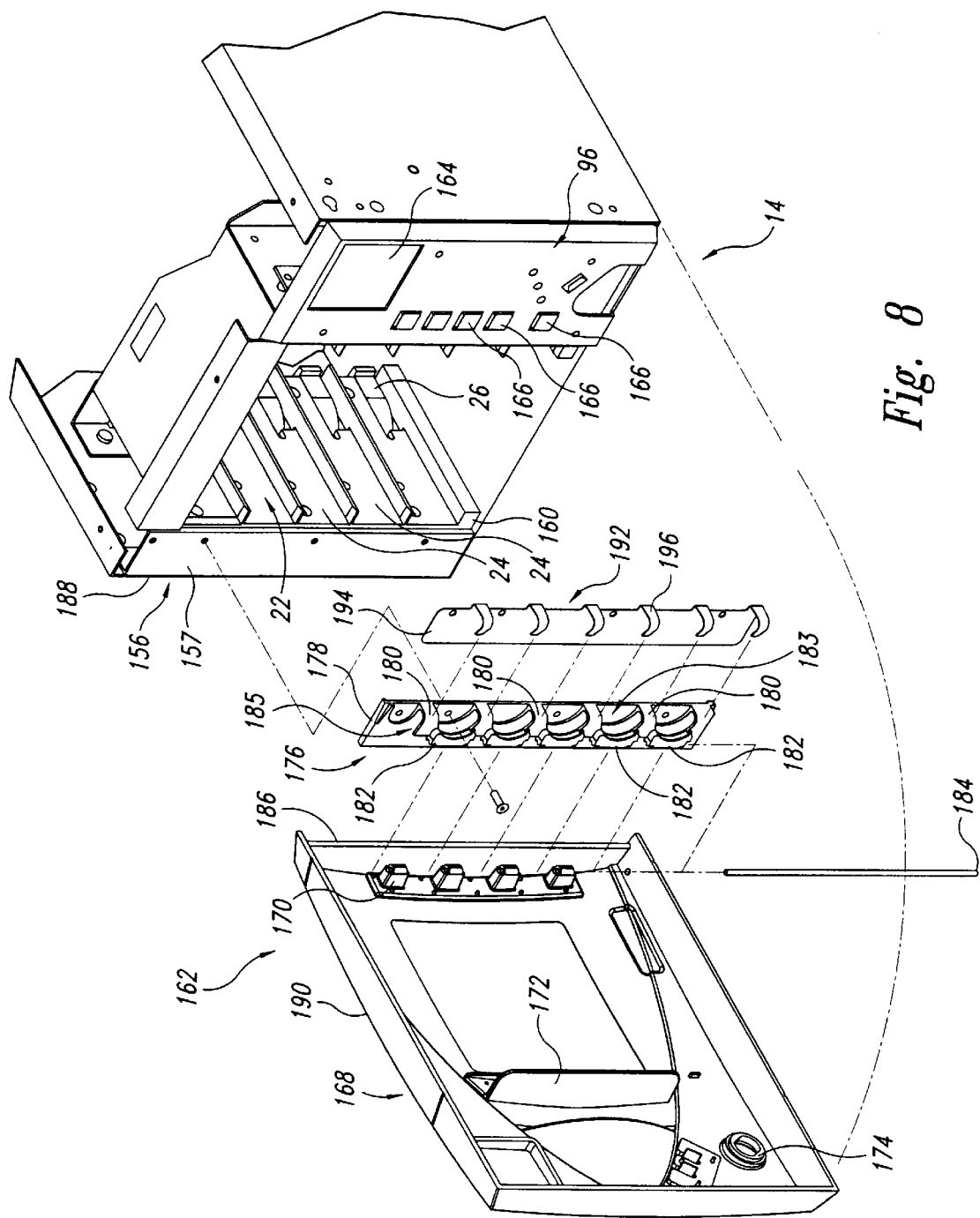
FIG. 8 is an enlarged, exploded isometric view of a door assembly for one embodiment of the storage library of FIG. 1.
Figure 9:
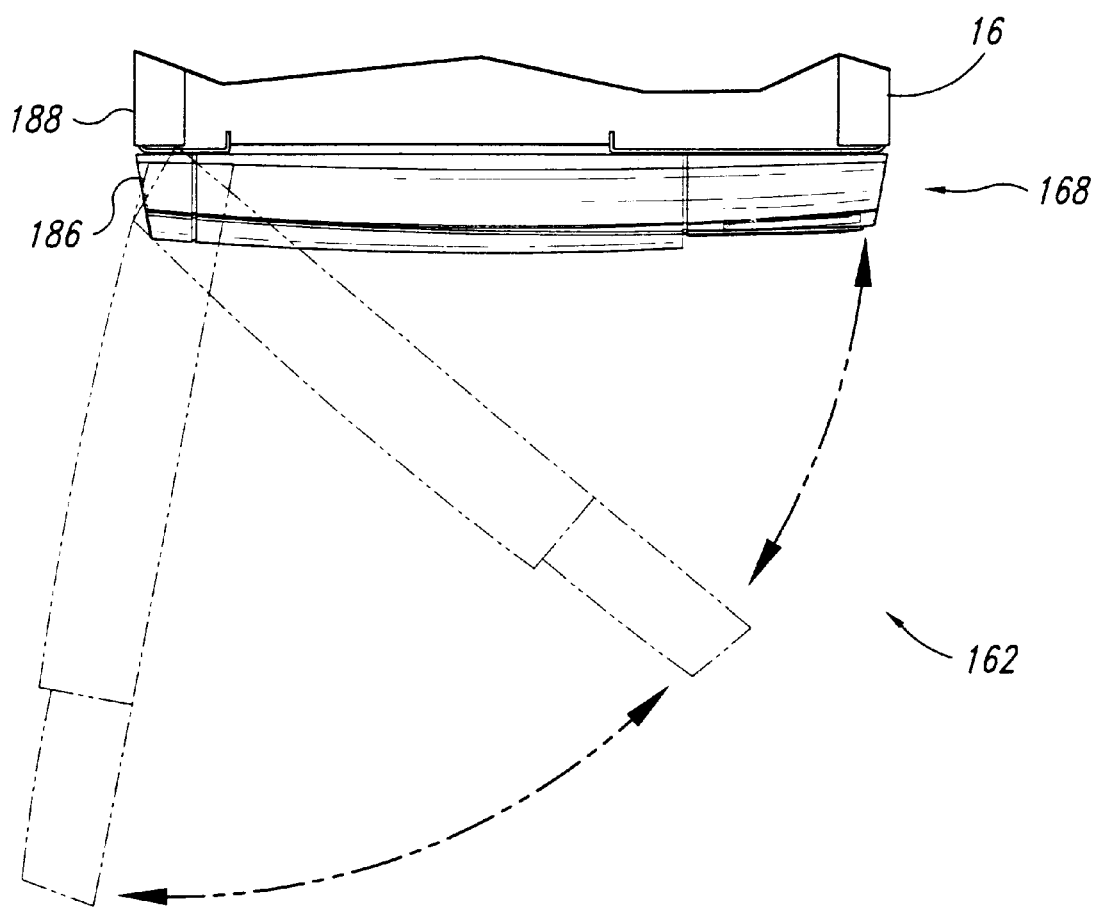
FIG. 9 is a top view of the door assembly of FIG. 8.

FIG. 2 is an exploded isometric view of portions of the library 14 of FIG. 1. The library 14 includes a chassis 16, which has a front opening 18 and a rear receptacle 20. In one embodiment of the invention, the layout and construction of the components within the chassis 16 allow the dimensions of the chassis 16 to be such that the library 14 can be mounted in a conventional component rack (such as shown in FIG. 9). For example, the chassis 16 may be approximately half a rack width wide and substantially a full rack depth long. Furthermore, a door assembly (such as shown in FIG. 8) may be mounted to the outside of the chassis 16 at the front opening 18.

A storage-media mailbox 22 is mounted adjacent to the front opening 18 of the chassis 16 and includes a number of storage-medium slots 24, which an operator can load and unload via the front opening 18. Although the slots 24 can be constructed to hold any conventional type of a storage medium, for clarity they will be discussed hereinafter as cartridge slots 24, which can hold a conventional magnetic-tape cartridge (such as shown in FIG. 7). A latch mechanism 25 is mounted adjacent to a rear end of the mailbox 22 at the ends of the slots 24 facing toward the rear receptacle 20. The latch mechanism 25 includes one latch 26 for each slot 24 to prevent the operator from inserting a cartridge too far into a respective slot 24. Conventional optical sensor assemblies 28 are mounted along the sides of the mailbox 22, and generate respective optical beams across the slots 24. A broken beam indicates that a cartridge is currently within the respective slot 24.

Furthermore, in one embodiment, additional storage-medium slots 30, which are not part of the mailbox 22, are mounted inside of the chassis 16 above the receptacle 20 and provide additional storage capacity. Each of the slots 30 includes a respective roller 32, which guides a cartridge as it is inserted into or removed from a slot 30. Conventional optical sensor assemblies 34, which are similar to the sensor assemblies 28, are mounted along the sides of the slots 30 within the chassis 16 to generate respective optical beams across the slots 30. A broken beam indicates that a cartridge is in a respective slot 30.

Each of the slots 24 of the mailbox 22 has an inner opening 38 at the rear end of the mailbox, and a top-bottom sensor assembly 36 generates a first optical beam across all of the inner openings 38 of the slots 24. Each of the slots 30 has an opening 40 located at an end facing toward the mailbox 22, and the sensor assembly 36 also generates a second optical beam across all of the openings 40 of the slots 30. The sensor assembly 36 has the beams located such that a broken first beam indicates that a cartridge is sticking too far out from one of the slots 24, and a broken second beam indicates that a cartridge is sticking too far out from one of the slots 30. The sensor assembly 36 also includes a transporter vertical-position sensor assembly 42, which generates an optical beam located such that the beam is broken when a storage-medium transporter is in a home position. The transporter is positioned within the chassis between the mailbox 22 and the slots 30, and is discussed below in conjunction with FIG. 4. The sensor assembly 36 also includes a cam-position sensor assembly 44, which generates an optical beam that is unbroken when a cam mechanism (such as shown in FIG. 4) of the storage-medium transporter is in a home position.

A transporter drive assembly 46 moves the storage-medium transporter in a vertical direction so as to align the transporter with a selected one of the slots 24, the slots 30, or a conventional media drive 48, which is positioned in the rear receptacle 20 and is discussed below in greater detail. The drive assembly 46 includes a belt assembly 50, which is driven by a transporter motor 52. In one embodiment, the motor 52 is a stepper motor, and a worm gear 54 is coupled to the shaft of the motor 52 and drives the belt assembly 50.

Figure 4:
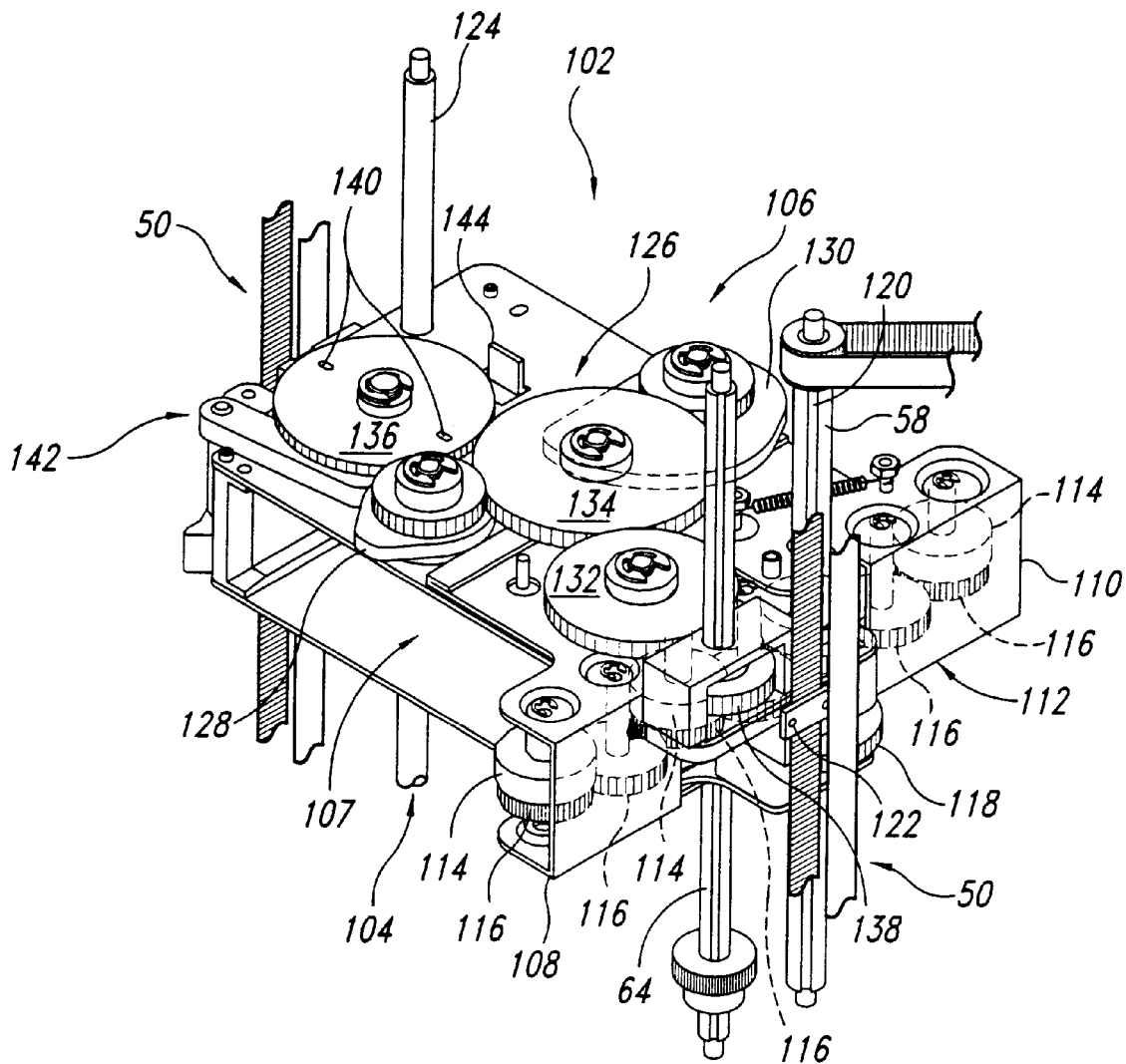
FIG. 4 is an enlarged, isometric view of the cartridge transporter of the storage library of FIG. 1.

A roller drive assembly 55 drives a roller mechanism (such as shown in FIG. 4) of the storage-medium transporter. The roller drive assembly 55 includes a roller motor 56, which drives a roller drive shaft 58. In one embodiment, the motor 56 is a stepper motor and drives the shaft 58 via a worm gear (not visible in FIG. 2).

A cam drive assembly 60 drives the cam mechanism of the storage-medium transporter. The cam drive assembly 60 includes a cam motor 62, which drives a cam drive shaft 64. In one embodiment, the motor 62 is a stepper motor and drives the shaft 64 via a worm gear 66.

A circuit board 68, which is shown in phantom line, is mounted to the inside of the chassis 16 and includes a library control circuit that controls the transporter drive assembly 46, the roller drive assembly 55 and the cam drive assembly 60, monitors the condition of the sensor assemblies 28, 34, 36, 42, and 44, and otherwise controls the operation of the library 14 as discussed below in conjunction with FIG. 3.

A module 70 fits within the rear receptacle 20 of the chassis 16. The construction of the module 70 and the rear receptacle 20 allows the operator to easily insert the module 70 into and remove the module 70 from the rear receptacle 20. The module 70 includes the media drive 48 and a circuit board 72, which includes an interface circuit (such as shown in FIG. 3) for interfacing the library control circuit on the circuit board 68 with the computer 12 of FIG. 1. The media drive 48 and the circuit board 72 are mounted to a sled 74, which, when inserted into the rear receptacle 20, engages conventional left- and right-side runners 76, which are mounted to the inside of the chassis 16. A connector 78 is mounted to the circuit board 72 and is coupled to the interface circuit on the circuit board 72. The connector 78 mates with a connector 80—which is mounted to the circuit board 68 and is coupled to the library control circuit on the circuit board 68—when the module 70 is fully inserted within the rear receptacle 20. Thus, the connectors 78 and 80 provide a communication path between the library control circuit and the interface circuit. A connector 82, which is mounted to the circuit board 72, provides a communication path between the interface circuit and the computer 12. Furthermore, when the module 70 is inserted within the rear receptacle 20, an opening 84 of the media drive 48, which receives the storage medium, is located below the slots 30 so that the storage-medium transporter can load and unload a storage medium into and from the media drive 48 via the opening 84 without interference from the slots 30. Therefore, the top-bottom sensor assembly 36 is located to also generate the second optical beam across the opening 84, so that a cartridge sticking too far out of the opening 84 will break the second beam.

Because the module 70 is easily removable and insertable, the operator or a technician can easily modify the library 14 at the factory or in the field to meet a customer's specific requirements. For example, the operator or technician can modify the interface protocol and the type of the drive 48 by merely inserting into the rear receptacle 20 another module 70 having the appropriate media drive 48 and circuit board 72. Different modules 70 can be provided for virtually all of the conventional interface protocols, including ultra-wide, fast SCSI, single-ended SCSI, differential SCSI, or fiber-channel.

Furthermore, the removable module 70 allows one to manufacture a single version of the library 14 base unit, which includes all parts of the library 14 other than those included as part of the module 70. Thus, because only different versions of the module 70 need be manufactured to meet a customer's specific interface and drive requirements, the costs and complexities of the manufacturing process are significantly less than for libraries that do not include such a removable module.

A power supply 86 and a power connector 88 are also mounted within the chassis 16. When connected to an external power source (not shown in FIG. 2) via the connector 88, the power supply 86 provides power to the circuit board 68, the drive assemblies 46, 55, and 60, and the sensor assemblies 28, 34, 36, 42, and 44, and to the media drive 48 and the circuit board 72 when the module 70 is installed within the rear receptacle 20.

Figure 3:
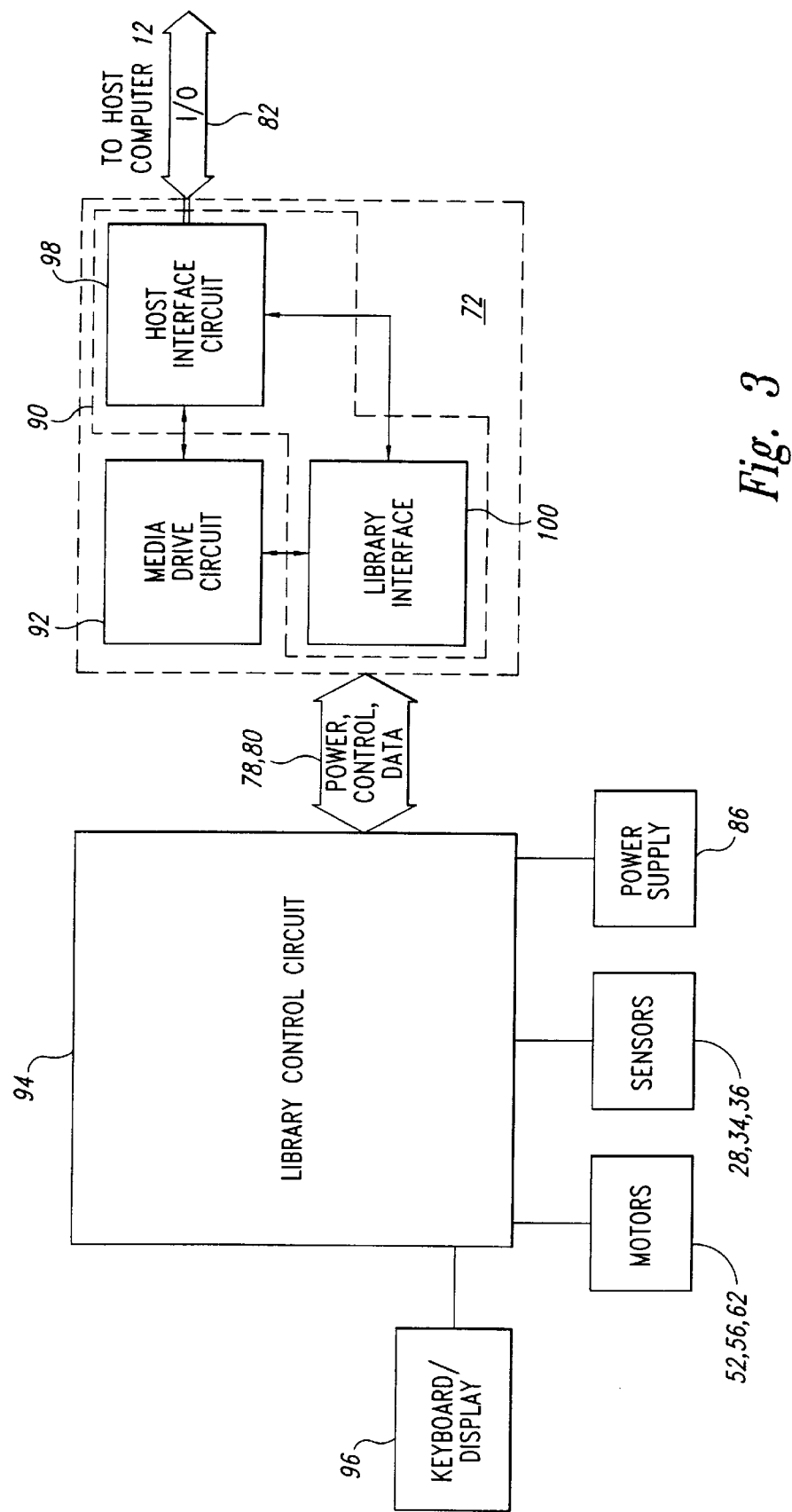
FIG. 3 is a block diagram of the circuitry of the storage library of FIG. 1.

FIG. 3 is a schematic block diagram of the electronic circuitry of the library 14 of FIG. 2. But because the specific circuitry used within each of the blocks is conventional, it is not discussed in detail.

This circuitry includes an interface circuit 90 and a media drive circuit 92. The circuit 90 communicates with the computer 12 of FIG. 1 via the connector 82 and is located on the circuit board 72, which, as discussed above in conjunction with FIG. 2, is located on the removable module 70. The media drive circuit 92 communicates with the interface circuit 90, and may be located entirely within the media drive 48 of FIG. 2, entirely on the circuit board 72, or may have a portion that is located within the media drive 48 and another portion that is located on the circuit board 72.

A library control circuit 94 is located on the circuit board 68 of FIG. 2 and communicates with the motors 52, 56, and 62, the sensor assemblies 28, 34, 36, 42 and 44, and the power supply 86 all of FIG. 2, and a keyboard display assembly 96, which allows the operator to input data or commands directly into the library 14 and to select different software options that the control circuit 94 supports. In one embodiment, the library control circuit 94 includes one or more conventional microprocessors or microcontrollers (not shown in FIG. 3). Furthermore, the connectors 78 and 80 allow power, control information, and data to be passed back and forth between the library control circuit 94 and the interface circuit 90.

In one embodiment, the interface circuit 90 includes a host interface circuit 98 and a library interface circuit 100. The host interface circuit 98 is coupled to the computer 12 via the connector 82, and is also coupled to the library interface circuit 100, which is coupled to the library control circuit 94. The media drive circuit 92 is coupled to the host interface circuit 98, and in one embodiment is also coupled to the library interface circuit 100.

FIG. 4 is an isometric view of a storage-medium transporter 102, which is mounted in the chassis 16 of FIG. 2 between the mailbox 22 and the slots 30 such that a front opening 104 of the transporter 102 faces the mailbox 22 and a rear opening 106 faces the slots 30 and the rear receptacle 20. In one embodiment, the transporter 102 moves vertically up and down and is constructed to bi-directionally transport a magnetic-tape cartridge, such as a DLT cartridge (such as shown in FIG. 7), through a passageway 107 extending between the front and rear openings 104 and 106. Therefore, although the transporter 102 can be constructed to transport any type of storage medium, for example purposes, the embodiment of the transporter 102 hereinafter described will be for transporting a DLT cartridge.

The transporter 102 includes spring-loaded front and rear roller arms 108 and 110, which each pivot between an opened and closed position to respectively release and grasp a cartridge. Each of the roller arms 108 and 110 carries a respective portion of a roller mechanism 112, which includes a number of rollers 114. The rollers 114 are rotationally intercoupled by meshing gears 116. The roller drive shaft 58 rotates a roller drive gear 118, which in turn drives the rollers 114 via the gears 116. The shaft 58 has a slot or keyway 120, which engages a spline or key along the inner circumference of the gear 118 to allow the gear 118 to move freely up and down on the shaft 58 as the transporter 102 moves up and down.

The transporter 102 is fixedly attached to the belt assembly 50 by belt couplings 122. Furthermore, a support shaft 124 guides and stabilizes the transporter 102 as it is moved up and down along the shaft 124 by the belt assembly 50.

The transporter 102 also includes a cam mechanism 126, which includes a latch-release-and-front-roller-arm cam 128, a final-push-and-rear-roller-arm cam 130, and cam intercoupling gears 132, 134, and 136. The cam drive shaft 64 rotates a cam drive gear 138, which in turn drives the cam mechanism 126. Like the roller drive shaft 58 and the roller drive gear 118, the cam drive shaft 62 has a keyway and the cam drive gear 138 has a key such that the cam drive gear 138 can move freely up and down on the cam drive shaft 62 as the transporter 102 moves up and down. The cam gear 136 includes at least one homing opening 140, which, when aligned with the optical beam generated by the cam sensor assembly 44 of FIG. 2, indicates that the cam mechanism 126 is in a home position. Portions of the transporter 102 that are positioned below the gear 136 have openings that are aligned with the optical beam of the cam sensor assembly 44 such that when the opening 140 is in the home position, the beam can pass through the opening 140 uninterrupted.

The transporter 102 also includes a latch-plunger assembly 142, which releases the latch mechanism 25 of FIG. 2 when the transporter 102 is removing a cartridge from the mailbox 22. The transporter 102 also includes a homing tab 144, which breaks the optical beam generated by the vertical-position sensor assembly 42 of FIG. 2 when the transporter 102 is in a home position.

Referring to FIGS. 2, 3, and 4, during operation of the library 14, the operator inserts a cartridge into one of the slots 24 in the mailbox 22 until the latch 26 of the slot stops the operator from inserting the cartridge any farther. Next, the transporter motor 52 rotates and the transporter drive assembly 46 moves the transport 102 upwards until the homing tab 144 breaks the beam generated by the sensor assembly 42. Then, the library control circuit 94 receives from the respective optical sensor assembly 28 a signal that indicates that the cartridge is within the slot 24. The circuit 94 next controls the transporter motor 52 to rotate a known number of steps so that the drive assembly 46 moves the transporter 102 downward until the front opening 104 of the transporter 102 is aligned with the slot 24 containing the cartridge. The counting of the steps may be conventional, or may take into account the backlash of the transporter drive assembly 46 as discussed below.

FIGS. 5A–5D show respective positions of the roller mechanism 112 and the cam mechanism 126 during a load/unload sequence where the transporter 102 retrieves a cartridge 146 from one of the storage slots 24 of FIG. 2 and loads the cartridge into one of the slots 30 or the media drive 48 of FIG. 2.

Figure 5A:
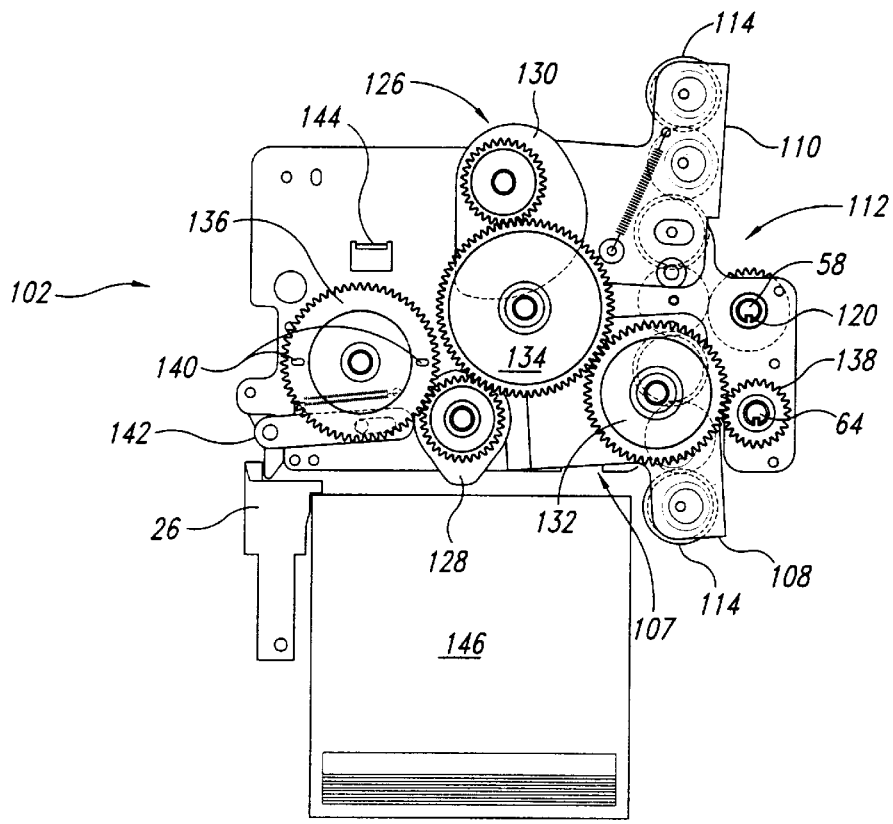
FIGS. 5A–5D show the respective positions of the cam mechanism and roller mechanism of the cartridge transporter of FIG. 4 during a sequence where the transporter retrieves a cartridge from a storage slot and loads the cartridge into a media drive.

Referring to FIG. 5A, at some time before the transporter 102 moves into its home position, the cam motor 62 rotates until the cam mechanism 126 is in the home position. In this position, both of the front and back roller arms 108 and 110 are in their respective opened positions such that as the transporter 102 moves, the arms 108 and 110 will not contact a cartridge 146 that is in one of the slots 24 or 30. As stated above, the circuit 94 of FIG. 3 determines that the cam mechanism 126 is in the home position when the optical beam generated by the sensor assembly 44 of FIG. 2 is unbroken. In one embodiment, the gear ratios of the cams 128 and 130 and the gears 132, 134, and 136 are such that the cam mechanism 126 is in the home position when either of the two openings 140 is aligned with the optical beam.

Still referring to FIG. 5A, it is known that in most gear systems, such as the cam mechanism 126, there occurs a phenomenon known as backlash. The degree of backlash is the amount of free play between the gears as they rotate from one direction to another direction. That is, the manufacturing tolerances of the gear-tooth widths arc often such that when the teeth of one gear are entered between the respective teeth of a meshing gear, there arc spaces between the adjacent gear teeth. Thus, before they engage, the gears must rotate slightly until one tooth contacts an adjacent tooth of a meshing gear. Therefore, because the next position of the cam mechanism 126 is determined by counting the number of steps that the cam motor 62 of FIG. 2 rotates from the present position, the circuit 94 of FIG. 3 may be programmed to account for the backlash when the rotational direction of the present rotation of the cam motor 62 is different than the rotational direction of the immediately previous rotation.

In one embodiment, the circuit 94 accounts for backlash by storing the number of rotational steps of the cam motor 62 needed to compensate for the backlash. This number then becomes part of the total number of steps required to rotate the cam motor 62 so that the cam mechanism 126 will be in the desired position relative to the present position. The backlash number may be empirically determined, or may be determined for each cam mechanism 126 by rotating the cam mechanism 126 in a first direction until the gears engage, rotating the cam mechanism in a second direction until the gears engage, and counting the number of steps that the cam motor 62 rotates in the second direction. For example, after the cam mechanism 126 is moved in a first direction into the home position, the circuit 94 counts the number of steps—the backlash number—that the cam motor 62 must rotate in the opposite direction to move the cam mechanism 126 out of the home position. As discussed above, this type of backlash compensation can also be used in the transporter drive assembly 46. But backlash is typically much less of a problem for a belt drive, and thus can often be ignored in a belt-driven assembly such as used for the transporter drive assembly 46.

Figure 5B:
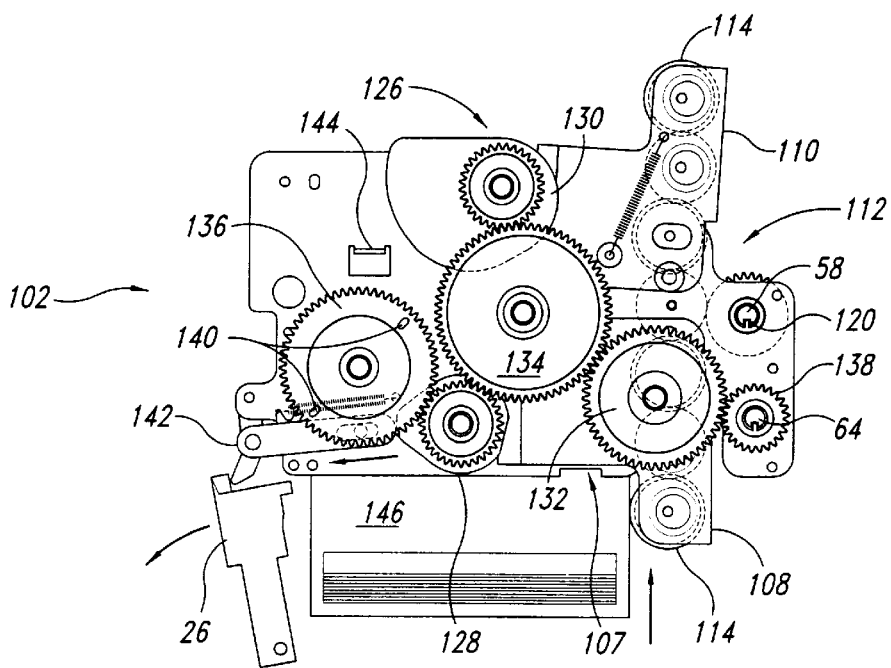

Referring to FIG. 5B, once the transporter 102 has been aligned with the appropriate slot 24 of FIG. 2, the cam motor 62 of FIG. 2 rotates the appropriate number of steps such that the cam mechanism 126 is in the mailbox-unload position. In this position, the cam 128 causes the latch-plunger assembly 142 to disengage the latch 26 of the slot 24 so that the transporter 102 can unload the cartridge 146 from the slot 24. The cam 128 also causes the front roller arm 108 to Close such that the rollers 114 of the roller mechanism 112 engage the side of the cartridge 146. The roller motor 56 of FIG. 2 then rotates a predetermined number of motor steps to rotate the rollers 114 such that they approximately center the cartridge 146 within the passageway 107 of the transporter 102. In one embodiment, the circuit 94 of FIG. 3 compensates for backlash in the roller mechanism 112 as discussed above for the cam mechanism 126.

Still referring to FIG. 5B, the transporter motor 52 of FIG. 2 rotates a predetermined number of motor steps to move the transporter 102 up or down as needed to align the cartridge 146 within the transporter 102 with its destination, which is either one of the slots 30 or the opening 84 of the media drive 48, all of FIG. 2. The rear roller arm 110 remains open so that as the transporter 102 moves, the roller arm 110 does not contact another cartridge 146 that may be in another one of the slots 30 other than the destination slot 30.

Figure 5C:
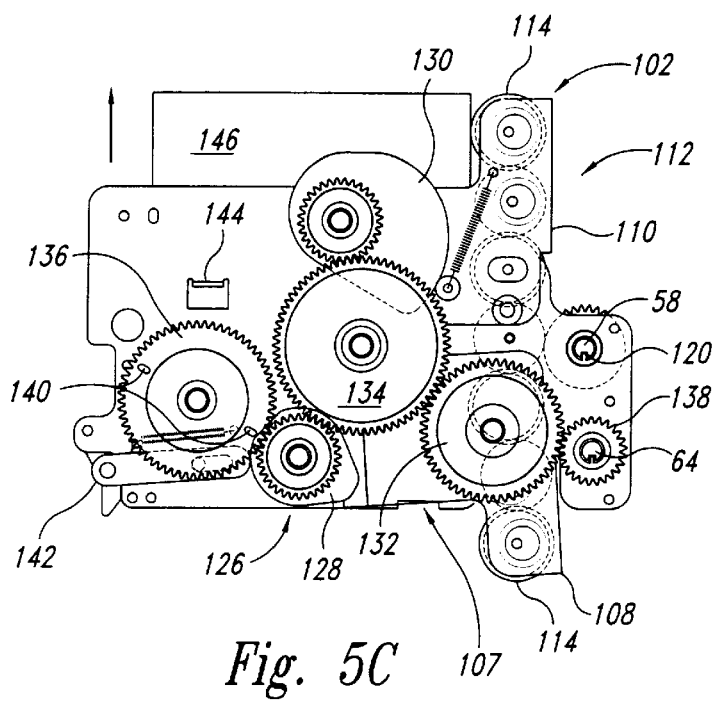

Referring to FIG. 5C, after the cartridge 146 has been aligned with its destination, the cam motor 62 of FIG. 2 rotates a predetermined number of steps such that the cam mechanism 126 is in a media-drive/rear-slot unload position. In this position, the cam 128 disengages the latch-plunger assembly 142 and opens the front roller and 108. Furthermore, the cam 130 closes the rear roller and 110. Once the rear roller arm 110 is closed, the roller motor 56 of FIG. 2 rotates a predetermined number of steps such that the rollers 114 move the cartridge 146 into its destination.

If, as shown in FIG. 5C, the destination is one of the slots 30 of FIG. 2, then the circuit 94 of FIG. 3 monitors the sensor assembly 36 of FIG. 2 to determine if the second optical beam that is directed across the openings 40 of the slots and the opening 84 of the media drive 48 is broken or unbroken. If the beam is unbroken, then the circuit 94 determines that the cartridge 146 has been fully inserted into the destination slot 30. If the beam is broken, then the circuit 94 causes the roller motor 56 to rotate additional steps until the rollers 114 insert the cartridge 146 fully into the destination slot 30. Alternatively, instead of counting the number of steps that the roller motor 56 rotates, the circuit 94 can cause the roller motor 56 to continue rotating until the beam is unbroken, thus indicating that the cartridge 146 has been fully inserted into the destination slot 30.

Figure 5D:
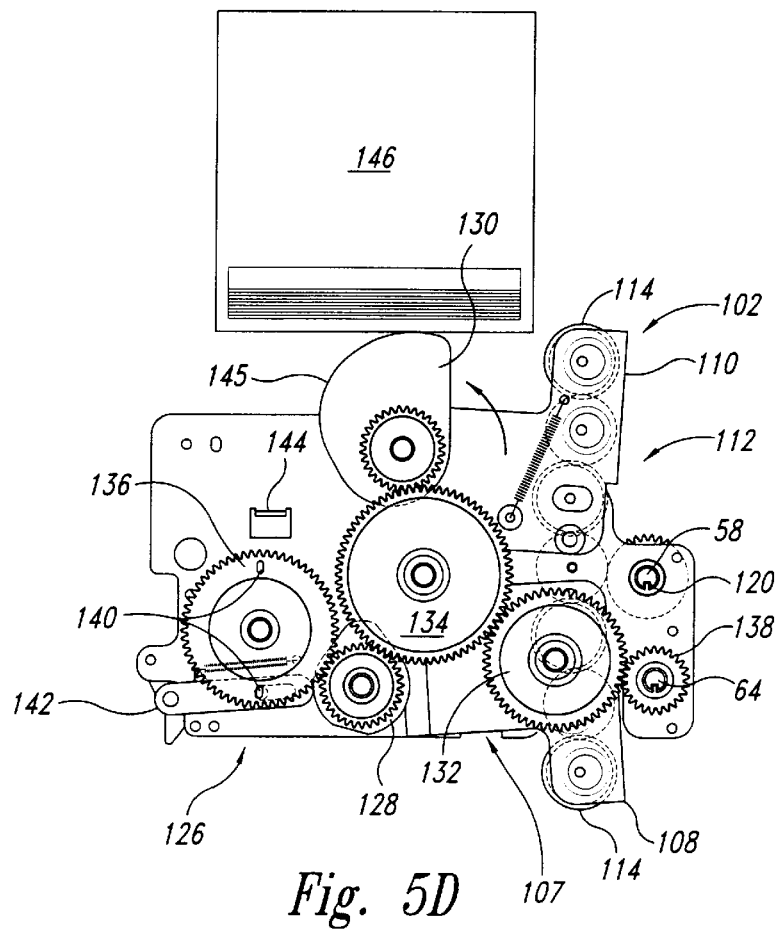

If, as shown in FIG. 5D, the cartridge destination is the media drive 48 of FIG. 2, then the rollers 114 often cannot fully insert the cartridge 146 into the opening 84 of the media drive 48. Thus, after the initial moving of the cartridge into its destination as described in conjunction with FIG. 5C, the cartridge 146 is often inserted only part way into the opening 84. Therefore, the second optical beam is broken, and the circuit 94 of FIG. 3 controls the cam mechanism 126 to perform an additional step called the "final push." During this step, the cam mechanism 126 pushes the cartridge 146 the remaining way into the opening 84, or at least far enough into the opening 84 so that the conventional cartridge intake mechanism of the media drive 48 is activated. Once activated, the intake mechanism retracts the cartridge 146 the remaining way into the media drive 48. More specifically, the transporter drive assembly 46 moves the cartridge transporter 102 such that the cam 130 is aligned with the opening 84 of the media drive 48. The cam 130 rotates in the direction shown by the arrow in FIG. 5D so as to open the rear roller arm 110 and push the cartridge 146 into the opening 84. In one embodiment, this is the only step where the rotational direction of the cam mechanism 126, specifically the rotational direction of the cam 130, is not arbitrary, but is in the indicated direction so that a gradually sloped surface 145 of the cam 130 engages the cartridge 146 and provides a relatively smooth push thereto. In another embodiment, the cam 130 is more symmetrically shaped such that it can rotate in either direction for the final push.

Although FIGS. 5A–5D describe a sequence of steps for transporting a cartridge 146 from one of the slots 24 of FIG. 2 to one of the slots 30 or the media drive 48, the sequence is reversed for transporting the cartridge 146 from the slot 30 or the media drive 48 to a slot 24.

Figure 6:
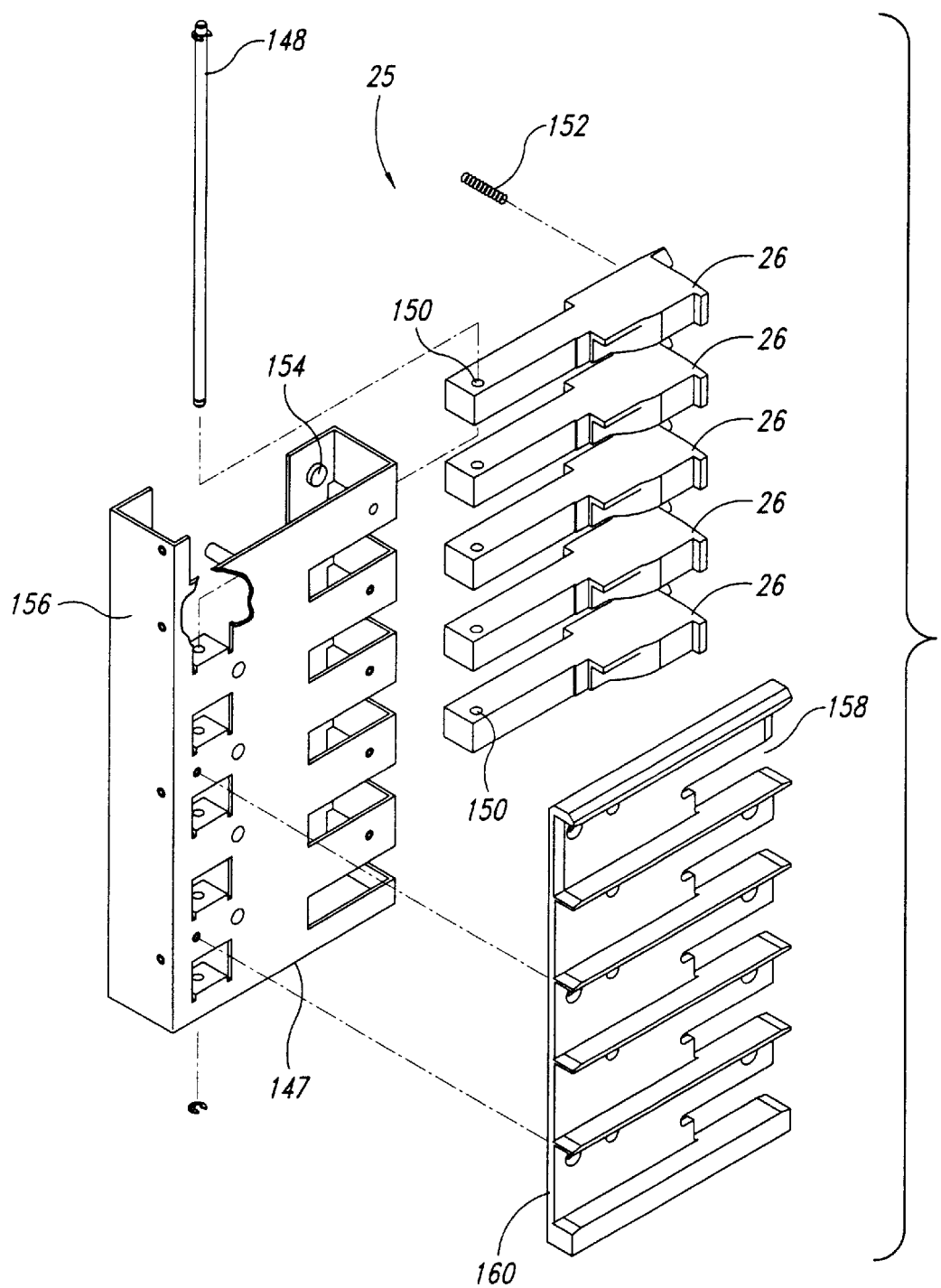
FIG. 6 is an enlarged, exploded isometric view of the latch mechanism of the storage library of FIG. 1.

FIG. 6 is an exploded isometric view of the latch mechanism 25, which is supported by a support wall portion 147 of the mailbox 22 of FIG. 2. The latch mechanism 25 includes a pivot pin 148, which extends through an opening 150 formed in each of latches 26. A latch spring 152 is positioned between the back side of each latch 26 and a respective spring receptacle 154, which is located on a mailbox support and jamb member 156 of the mailbox 22. For clarity, only one spring 152 and one receptacle 154 are shown in FIG. 6. The latches 26 are biased by the springs 152 to extend through respective latch openings 158 in a side portion 160 of the mailbox 22. The latches 26 are pivoted back so as not to extend through the respective latch openings 158 when the latch-plunger assembly 142 of FIG. 4 engages them.

A conventional DLT cartridge 146, such as shown in FIGS. 5A–5D, is shown in FIG. 7 with portions shown in phantom line. Although one embodiment of the library 14 is constructed to receive DLT cartridges, other embodiments of the library 14 can be constructed to receive other types of storage media such as 4 millimeter (mm) and 8 mm tape cartridges. In such embodiments, the mailbox 22 and the slots 30 of FIG. 2 are constructed to respectively receive such other media cartridges, and the respective removable module 70 of FIG. 2 includes a media drive 48 for accepting such cartridges.

FIG. 8 is an exploded isometric view of one embodiment of the keyboard/display panel 96 of FIG. 3 and one embodiment of a door assembly 162 for the library 14 of FIG. 1. The keyboard/display panel 96 includes a conventional display 164 and conventional punch keys 166, and allows the operator to manually input data and instructions to the library control circuit 94 of FIG. 3 The library control circuit 94 may also display a software menu from which the operator can select function options with the keys 166.

The door assembly 162 includes a door 168 having hinge cylinders 170 and a cartridge-alignment protrusion 172, which engages the cartridge or cartridges 146 of FIG. 7 and ensures that they are fully inserted into the slots 24 when the door 168 is closed. The door 168 may also include a lock 174, which impedes unauthorized access to the mailbox 22 and any cartridges 146 therein. The lock 174 may be a conventional key lock, or may be an electronic lock that is controlled by the computer 12 of FIG. 1 via the library control circuit 94 of FIG. 3.

The door assembly 162 also includes a hinge assembly 176, which includes a support plate 178, resilient extensions or fingers 180, and hinge cylinders 182. The support plate 178 is attached to a forward-facing front jamb portion 157 of mailbox jamb member 156, and the hinge cylinders 170 of the door 168 are pivotally connected to the hinge cylinders 182. The hinge cylinders 170 and 182 are retained in an interlocked position by a hinge pin 184 extending therethrough. The fingers 180 extend out from an edge of the support plate 178 and curve towards the front side of the support plate 178. The hinge cylinders 182 are attached between the ends of adjacent ones of the fingers 180. In one embodiment, resulting spaces 183 are defined between adjacent ones of the fingers 180. The spaces 183 are shaped to allow the operator to position a finger therein so that the hinge assembly 176 does not hinder the operator when grasping the cartridge 146 to insert or remove the cartridge 146 from one of the slots 24. Furthermore, the fingers 180 are relatively rigid and resist movement in a vertical direction to provide solid support for the weight of the door 168.

FIG. 9 is a top view of the door assembly 162, and shows various positions of the door 168 as it moves between opened and closed positions. Referring to FIGS. 8 and 9, the hinge cylinders 170 and 182 of the door assembly 162, and the hinge pin 184 which extends therethrough, are offset laterally inward from the sidewall 188 of the library chassis 16 so that the door 168 can be opened without encroaching on an adjacent rack space. Specifically, a hinged side 186 of the door 168 is positioned at or inward from the sidewall 188 of the library chassis 16 when the door is closed. Thus, when the door 168 is in the closed position, it covers virtually the entire front side of the library 14, including the hinge assembly 176, without encroaching on the space occupied by any adjacent rack-mounted components, such as another library 14. Furthermore, as the door 168 is opened or closed, the hinge assembly 176, as discussed below, prevents the hinged side 186 of the door 168 from encroaching on the adjacent rack space by reducing the distance that the hinged side 186 extends beyond the sidewall 188 as compared with conventional hinges. In one embodiment, no part of the hinged side 186 extends beyond the sidewall 188 when the door 168 is opened, closed, or in any position therebetween.

Figure 10A:
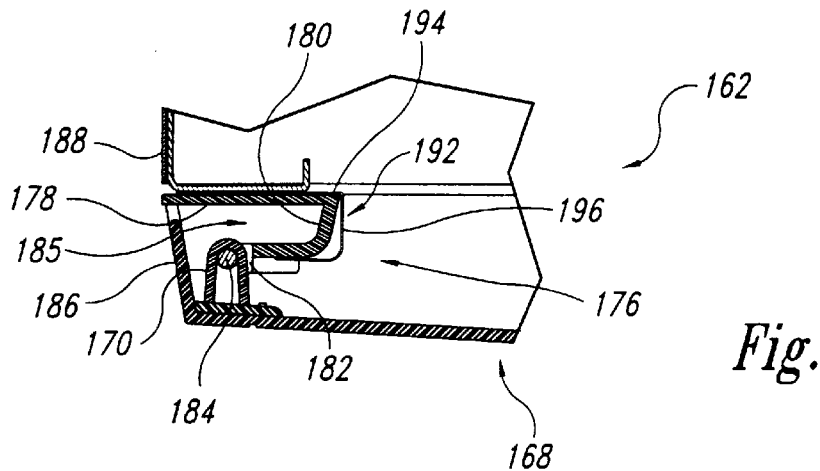
FIGS. 10A–10C are cut-away top views of the door assembly of FIGS. 8 and 9.
Figure 10B:
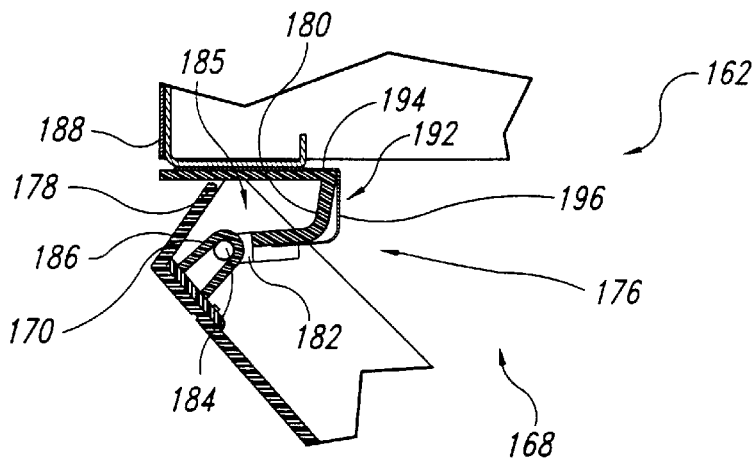
Figure 10C:
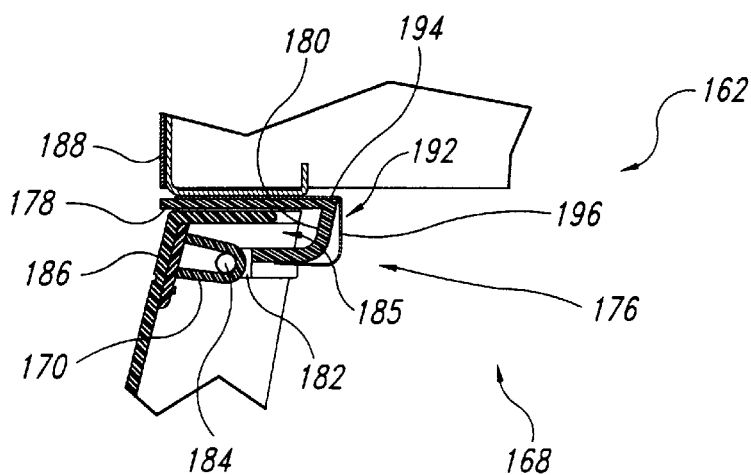

FIGS. 10A–10C are cut-away top views of the door assembly 162 and the hinge assembly 176 when the door 168 is in a closed position, intermediate position, and opened position, respectively. Referring to FIG. 10A, the fingers 180 project forward from the support plate 178 and curve laterally outward to position the hinge cylinders 182 spaced apart from the support plate 178 and to define a laterally open space 185 therebetween. Referring to FIG. 10B, as the door 168 is rotated into the opened position, the hinged side 186 of the door 168 moves into the space 185 so that the door 168 may be opened and closed uninhibited by the offset hinge-line arrangement used. Specifically, fingers 180 are flexible in the outward (away from the chassis 16) and inward (toward the chassis 16) directions such that as the hinged side 186 engages the front of the plate 178, the fingers 180 flex to allow the hinged side 186 to slide against the plate 178 as the door 168 moves between closed and opened positions. Furthermore, in one embodiment, the spring force with which the fingers 180 push the hinged side 186 against the plate 178 is sufficient for the door 168 to be stable in many partially open positions. Referring to FIG. 10C, when the door 168 is fully open, the fingers 180 return to their unflexed positions (as in FIG. 10A), and the hinged side 186 is parallel or approximately parallel to and abuts the plate 178. Because moving the door 168 toward the closed position causes the fingers 180 to flex outward and force the side 186 against the plate 178, the hinge assembly 176 tends to hold the door 168 open against unintentional closing.

Referring to FIGS. 9 and 10C, in some embodiments, depending on the angle the side 186 makes with a door front face 190, the door 168 may open more than 90° such that portions of the front face 190 may extend beyond the chassis sidewall 188. But this typically does not cause the door 168 to significantly encroach upon an adjacent space, because an adjacent component typically does not extend forward far enough for these encroaching portions of the front face 190 to contact the adjacent component. But even if it is possible to open the door 168 far enough to encroach, the door 168 need not open to more than an approximately 90° position—which is not encroaching—to allow the operator to insert and remove a cartridge 146 from the mailbox 22.

Referring to FIGS. 8 and 10B, in one embodiment, the fingers 180 are formed from a conventional plastic. But it has also been found that with repeated openings and closings of the door 168, the fingers 180 may become deformed from their desired shape. That is, the resiliency of the fingers 180 may be too low, and thus the hysteresis of the fingers 180 may be too high, for the fingers 180 to maintain their desired shape. Therefore, a metal spring member 192 overlaying the fingers 180 is used to increase the effective resiliency of the fingers 180. The spring member 192 includes a plate 194 that is installed between the jamb portion 157 of the mailbox member 156 and the hinge plate 178. The spring member 194 also includes fingers 196, which extend around and overlay the fingers 180. The spring member 194 is formed from a material, such as metal, that has a significantly higher resiliency than the material from which the fingers 180 are formed. Thus, the fingers 196 of the spring member 194 force the respective fingers 180 back into their desired shapes after each opening and closing of the door 168. An actual door assembly 162 in accordance with this embodiment has been tested over a million times, and has been found to be very reliable.

Furthermore, referring to FIGS. 8, 9, and 10c, it is noted that with the described door assembly 162, if the door 168 is pressed open farther than the intended fully open position, the opening force applied to move it beyond the fully open position will be resisted by the spring force of the fingers 180, and if present, the spring member 192. Thus, the fingers 180 and 196 can bend under this excess opening force without he hinge assembly 176 breaking.

Figure 11:
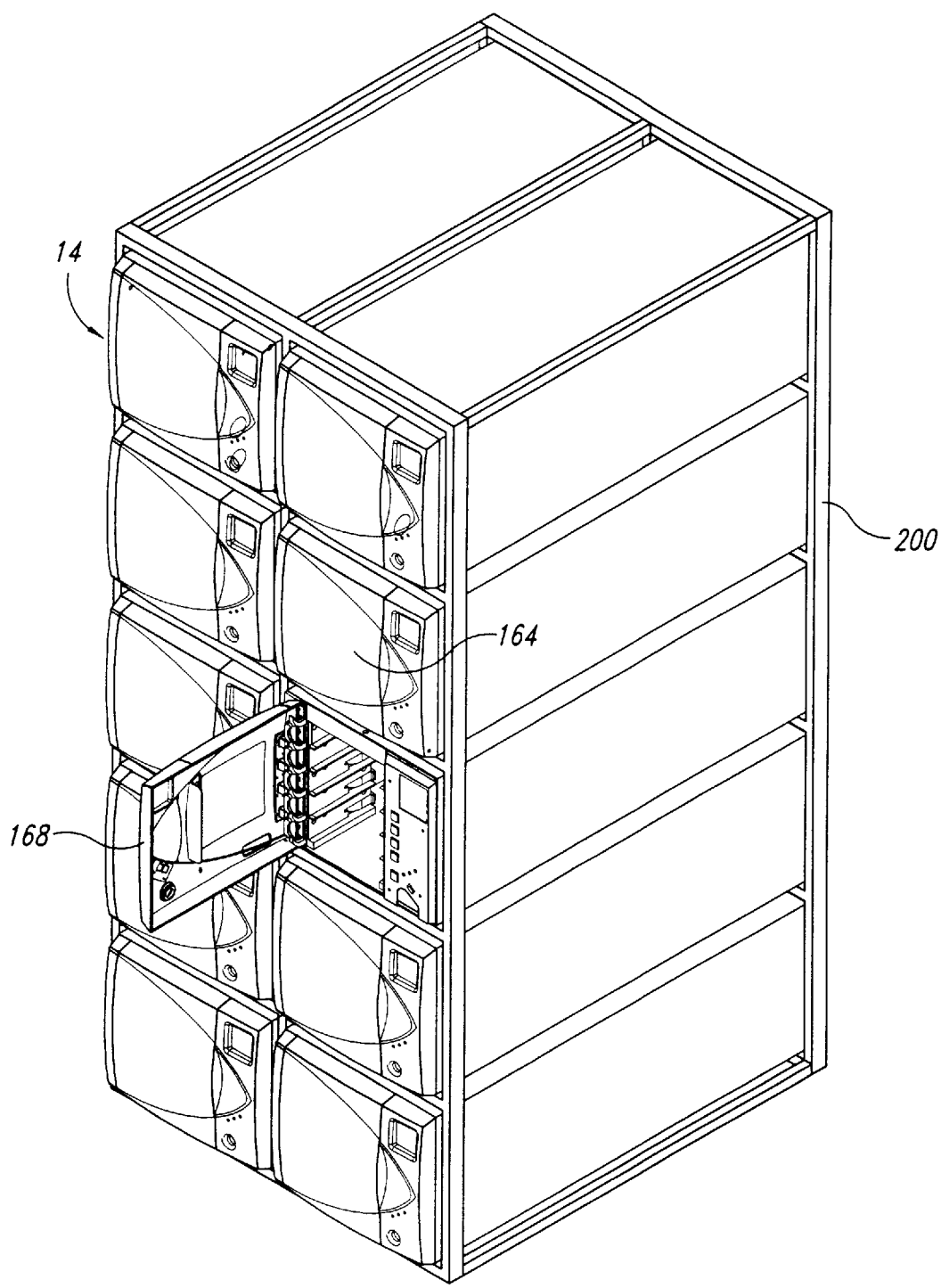
FIG. 11 is an isometric view of several storage libraries of FIG. 1, that are rack mounted and that incorporate the door assembly of FIG. 8.

FIG. 11 is an isometric view of ten of the libraries 14 of FIG. 1 mounted in a rack 200. As shown, neither the opened nor closed doors 168 of the libraries 14 encroach on the respective rack spaces occupied by the adjacent libraries 14.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A library for storing a cartridge of data-storage media, comprising:

a chassis;

cartridge slots disposed within the chassis, each of the slots having an outer slot opening that faces outward of the chassis and an inner slot opening that faces inward of the chassis, each of the slots constructed to allow insertion and removal of the cartridge through both of the inner and outer slot openings thereof;

a media drive disposed within the chassis and spaced from the slots, the media drive having a drive opening that faces the inner slot openings, the media drive operable to receive and eject the cartridge through the drive opening;

a cartridge transporter disposed within the chassis between the slots and the media drive, the cartridge transporter having a first transporter opening that faces the slots, a second transporter opening that faces the media drive, a cartridge passage that extends between the first and second transporter openings, a first roller arm mounted to the cartridge transporter at a side thereof toward the first transporter opening, a second roller arm mounted to the cartridge transporter at a side thereof toward the second transporter opening, a cam mechanism operable to independently move the first and second roller alms, and a roller mechanism including at least one first roller mounted on the first roller arm and at least one second roller mounted on the second roller arm, the first and second roller arms being selectively and independently operable to move the cartridge through the cartridge passage;

a transporter drive assembly disposed within the chassis, coupled to the cartridge transporter, and operable to move the cartridge transporter to align the first transporter opening with the inner slot opening of a selected one of the slots and to align the second transporter opening with the drive opening of the media drive;

a cam drive assembly disposed within the chassis and coupled to the cam mechanism, the cam drive assembly being operable to move the cam mechanism to cause the first roller of the first roller arm to engage the cartridge while the first roller moves the cartridge between the cartridge transporter and the selected slot, and operable to control the cam mechanism to cause the second roller of the second roller arm to engage the cartridge while the second roller moves the cartridge between the cartridge transporter and the media drive; and a control circuit coupled to the transporter and cam drive assemblies and operable to control the transporter and cam drive assemblies.

2. The library of claim 1, further comprising a door mounted to the chassis, the door having an inner side that faces the outer slot openings of the cartridge slots when the door is closed, the door having a protrusion on the inner side that is operable to push the cartridge into the selected slot as the door is being closed.

3. The library of claim 1 wherein:
the cam mechanism includes a push cam that is mounted to the cartridge transporter and that is operable to extend beyond the second transporter opening;
the transporter drive assembly is operable to move the cartridge transporter to align the push cam with the drive opening of the media drive after the cartridge transporter has inserted the cartridge partially into the media drive; and
the cam drive assembly is operable to move the cam assembly so that the push cam extends beyond the second transporter opening and engages the cartridge partially in the media drive to push the cartridge a remaining way into the media drive.

4. The library of claim 1, further comprising:
a latch assembly disposed within the chassis along one side of the inner slot openings, the latch assembly including a latch for each slot, each latch operable, when engaged by the cartridge to prevent the cartridge from extending out from the inner opening of the respective slot more than a predetermined distance;
wherein the cam mechanism includes a movable member selectively engageable with the latch of the selected slot; and
wherein the cam drive assembly is operable to move the cam mechanism when the cartridge transporter is in a position with the first transporter opening aligned with the inner slot opening of the selected slot so that the member engages and causes the latch of the selected slot to disengage and allows the cartridge transporter to remove the cartridge from the selected slot.

5. The library of claim 1 wherein the roller mechanism comprises:
a plurality of rollers mounted along a side of the cartridge passage;
intercoupled gears that are operable to transfer rotational motion thereof to the plurality of rollers and the rollers of the first and second roller arms, one of the gears having a guide member;
a shaft with a longitudinal guide and that extends through the guided gear with the guided member thereof mating with the longitudinal guide such that the guided gear moves along the shaft when the transporter drive assembly moves the cartridge transporter; and
a roller drive assembly that is coupled to the shaft.

6. The library of claim 1 wherein the cam mechanism comprises:
first and second cams, each operable to independently engage the first and second roller arms, respectively;
intercoupled gears that are operable to transfer rotational motion thereof to the cams, one of the gears having a guide member; and a shaft with a longitudinal guide and that extends through the guided gear with the guide member mating with the longitudinal guide such that the guided gear moves along the shaft when the transporter drive assembly moves the cartridge transporter; and
wherein the cam drive assembly is coupled to the shaft.

7. The library of claim 1 wherein the transporter drive assembly comprises:
a guide shaft that extends through the cartridge transporter;
a belt assembly having the cartridge transporter attached thereto and that is operable to move the cartridge transporter along the shaft; and
a belt drive assembly that is coupled to the belt assembly.

8. The library of claim 1 wherein each of the slots have associated therewith a respective sensor assembly that is coupled to the control circuit and that is operable to indicate if the cartridge is in the respective slot.

9. The library of claim 1, further comprising a sensor assembly disposed within the chassis and coupled to the control circuit, the sensor assembly operable to indicate if the cartridge is extended out of the inner slot opening of any of the slots more than a predetermined distance.

10. The library of claim 1, further comprising a sensor assembly disposed within the chassis and coupled to the control circuit, the sensor assembly operable to indicate if the cartridge transporter is in a reference position.

11. The library of claim 1, further comprising a sensor assembly disposed within the chassis and coupled to the control circuit, the sensor assembly operable to indicate if the cam mechanism is in a reference position.

12. A library for storing a cartridge of data-storage media, comprising:
a chassis having a front, rear, and opposing sides extending at least partially between the front and rear of the chassis;
a mailbox disposed within and at the front of the chassis, the mailbox having mailbox slots, each of the slots having a front slot opening that faces toward the front of the chassis and a rear slot opening that faces toward the rear of the chassis, each of the slots constructed to allow insertion and removal of the cartridge through both of the front and rear slot openings thereof;
a media drive disposed within the chassis and spaced from the mailbox toward the rear of the chassis, the media drive having a drive opening that faces the front of the chassis, the media drive operable to receive and eject the cartridge through the drive opening;
a cartridge transporter disposed within the chassis between the mailbox and the media drive, the cartridge transporter having a first transporter opening that faces the front of the chassis, a second transporter opening that faces the rear of the chassis, and a cartridge passage that extends between the first and second transporter openings;
a transporter drive assembly disposed within the chassis, coupled to the cartridge transporter, and operable to move the cartridge transporter to align the first transporter opening with the rear slot opening of a selected mailbox slot and to align the second transporter opening with the drive opening of the media drive;
a first roller arm mounted to the cartridge transporter at a side thereof toward the first transporter opening and having a first roller;
a second roller arm mounted to the cartridge transporter at a side thereof toward the second transporter opening and having a second roller;

a roller mechanism mounted to the cartridge transporter and operable to move the cartridge through the cartridge passage, the roller mechanism including the first and second rollers and at least one passage roller positioned within the cartridge passage;

a roller drive assembly disposed within the chassis and coupled to and operable to rotatably drive the passage and first and second rollers;

a cam mechanism mounted to the cartridge transporter and operable to independently move the first and second roller arms into and out of engagement with the cartridge such that the first and second rollers, respectively, are selectively placed in driving contact with the cartridge;

a cam drive assembly disposed within the chassis and coupled to the cam mechanism, the cam drive assembly being operable to move the cam mechanism to cause the first roller arm to engage the cartridge as the first roller moves the cartridge between the cartridge transporter and the selected mailbox slot, and operable to move the cam mechanism to cause the second roller arm to engage the cartridge as the second roller moves the cartridge between the cartridge transporter and the media drive; and a control circuit coupled to the transporter, roller, and cam drive assemblies and operable to control the transporter, roller, and cam drive assemblies.

13. The library of claim 12 wherein:

the cam mechanism includes a push cam that is mounted to the cartridge transporter and that is operable to extend beyond the second transporter opening;

the transporter drive assembly is operable to move the cartridge transporter to align the push cam with the drive opening of the media drive after the cartridge transporter has inserted the cartridge partially into the media drive; and the cam drive assembly is operable to move the cam assembly so that the push cam extends beyond the second transporter opening and engages the cartridge partially in the media drive to push the cartridge fully into the media drive.

14. The library of claim 12, further comprising:

a latch assembly disposed within the chassis along one side of the inner slot openings of the mailbox slots, the latch assembly including a spring-loaded latch for each mailbox slot, each latch operable, when engaged by the cartridge, to prevent the cartridge from extending out from the inner opening of the respective mailbox slot more than a predetermined distance;

wherein the cam mechanism includes a spring-loaded member selectively engageable with the latch of the selected slot; and wherein the cam drive assembly is operable to move the cam mechanism when the cartridge transporter is in a position with the first transporter opening aligned with the inner slot opening of the selected mailbox slot so that the member engages and causes the latch of the selected slot to disengage and allows the cartridge transporter to remove the cartridge from the selected mailbox slot.

15. The library of claim 12, further comprising:

an optical cartridge-position sensor assembly coupled to the control circuit and operable to generate an optical beam adjacent to the rear slot openings of all of the mailbox slots;

wherein the roller mechanism comprises a plurality of passage rollers mounted along a side of the cartridge passage, and intercoupled gears that are operable to transfer rotational motion thereof to the first, second, and passage rollers, one of the gears having a guide member;

wherein the roller drive assembly comprises a roller drive shaft with a longitudinal guide and that extends through the guided gear with the guide member thereof mating with the longitudinal guide such that the guided gear moves along the roller drive shaft when the transporter drive assembly moves the cartridge transporter, and a roller driver that includes a stepper motor rotatably coupled to the roller drive shaft;

wherein the control circuit calculates a position of the cartridge within the cartridge passage by counting a number of steps that the stepper motor has rotated the roller drive shaft since the first roller began moving the cartridge from one of the mailbox slots and into the cartridge transporter; and wherein the control circuit calculates that the cartridge has been fully inserted into one of the mailbox slots by counting a number of steps that the stepper motor has rotated the roller drive shaft with respect to the optical beam first being broken by the cartridge as the first roller moves the cartridge from the cartridge transporter into the mailbox slot.

16. The library of claim 12, further comprising:

an optical cartridge-position sensor assembly coupled to the control circuit and operable to generate an optical beam adjacent to the rear slot openings of all of the mailbox slots;

wherein the roller mechanism comprises a plurality of passage rollers mounted along a side of the cartridge passage, and intercoupled gears that are operable to transfer rotational motion thereof to the first, second, and passage rollers, one of the gears having a guide member;

wherein the roller drive assembly comprises a roller drive shaft with a longitudinal guide and that extends through the guided gear with the guide member thereof mating with the longitudinal guide such that the guided gear moves along the roller drive shaft when the transporter drive assembly moves the cartridge transporter, and a roller driver that includes a stepper motor rotatably coupled to the roller drive shaft;

wherein the control circuit calculates that the cartridge is fully within the cartridge passage when the optical beam transitions from broken to unbroken after the first roller begins moving the cartridge from one of the mailbox slots into the cartridge transporter; and wherein the control circuit calculates that the cartridge has been fully inserted into one of the mailbox slots when the optical beam transitions from broken to unbroken after the passage rollers begin moving the cartridge into the mailbox slot from the cartridge transporter.

17. The library of claim 12, further comprising:

an optical cam-position sensor coupled to the control circuit and operable to generate an optical beam;

wherein the cartridge transporter has a beam opening that is aligned with the sensor and that allows the optical beam to pass therethrough;

wherein the cam mechanism comprises, first and second cams, each operable to independently engage the first and second roller arms, respectively, intercoupled gears that are operable to transfer rotational motion thereof to the cams, a first one of the gears having a guide member, a second one of the gears having a reference opening that is aligned with the beam opening of the cartridge transporter when the cam mechanism is in a reference position;

wherein the cam drive assembly comprises, a cam shaft with a longitudinal guide and that extends through the guided gear with the guide member thereof matting with the longitudinal guide such that the guided gear moves along the cam shaft when the transporter assembly moves the cartridge transporter, and a stepper motor that is coupled to the cam shaft; and wherein the control circuit determines that the cam mechanism is in the reference position when the optical beam is unbroken, and determines another position of the cam shaft by counting the number of steps that the stepper motor moves the cam mechanism with respect to the reference position.

18. The library of claim 12, further comprising:

an optical transporter-position sensor coupled to the control circuit and operable to generate an optical beam;

wherein the cartridge transporter includes a protrusion that interrupts the optical beam when the cartridge transporter is in a reference position;

wherein the transporter drive assembly comprises a guide shaft that extends through the cartridge transporter, a belt assembly having the cartridge transporter attached thereto and that is operable to move the cartridge transporter along the shaft, and a belt drive assembly that includes a stepper motor coupled to the belt assembly; and wherein the control circuit determines that the cartridge transporter is in the reference position when the optical beam is broken, and determines another position of the cartridge transporter by counting a number of steps that the stepper motor moves the belt assembly with respect to the reference position.

19. The library of claim 12 wherein:

the mailbox slots include respective optical sensor assemblies coupled to the control circuit and operable to generate respective optical beams across the interiors of the slots; and the control circuit determines that the cartridge is in one of the slots if the respective optical beam is broken.

20. The library of claim 12 wherein the mailbox slots are vertically stacked one on top of the other.

21. A library for storing a cartridge of data-storage media, comprising:

a chassis having a front, rear, and opposing sides extending at least partially between the front and rear of the chassis;

a mailbox disposed within and at the front of the chassis, the mailbox having mailbox slots, each of the slots having a front slot opening that faces toward the front of the chassis and a rear slot opening that faces toward the rear of the chassis, each of the slots constructed to allow insertion and removal of the cartridge through both of the front and rear slot openings thereof;

a media drive disposed within the chassis and spaced from the mailbox toward the rear of the chassis, the media drive having a drive opening that faces the front of the chassis, the media drive operable to receive and eject the cartridge through the drive opening;

a cartridge transporter disposed within the chassis between the mailbox and the media drive, the cartridge transporter having a first transporter opening that faces the front of the chassis, a second transporter opening that faces the rear of the chassis, and a cartridge passage that extends between the first and second transporter openings;

a transporter drive assembly disposed within the chassis, coupled to the cartridge transporter, and operable to move the cartridge transporter to align the first transporter opening with the rear slot opening of a selected mailbox slot and to align the second transporter opening with the drive opening of the media drive;

a first roller arm mounted to the cartridge transporter at a side thereof toward the first transporter opening and having a first roller;

a second roller arm mounted to the cartridge transporter at a side thereof toward the second transporter opening and having a second roller;

a roller mechanism mounted to the cartridge transporter and operable to move the cartridge through the cartridge passage the roller mechanism including the first and second rollers and at least one passage roller positioned within the cartridge passage;

a roller drive assembly disposed within the chassis and coupled to and operable to rotatable drive the passage and first and second rollers;

a cam mechanism mounted to the cartridge transporter and operable to move the first and second roller arms into and out of engagement with the cartridge;

a cam drive assembly disposed within the chassis and coupled to the cam mechanism, the cam drive assembly being operable to move the cam mechanism to cause the first roller arm to engage the cartridge as the first roller moves the cartridge between the cartridge transporter and the selected mailbox slot, and operable to move the cam mechanism to cause the second roller arm to engage the cartridge as the second roller moves the cartridge between the cartridge transporter and the media drive;

a control circuit coupled to the transporter, roller, and cam drive assemblies and operable to control the same; and an optical cartridge-position sensor assembly coupled to the control circuit and operable to generate an optical beam adjacent to the rear slot openings of all of the mailbox slots;

wherein the roller mechanism comprises a plurality of passage rollers mounted along a side of the cartridge passage, and intercoupled gears that are operable to transfer rotational motion thereof to the first, second, and passage rollers, one of the gears having a guide member;

wherein the roller drive assembly comprises a roller drive shaft with a longitudinal guide and that extends through the guided gear with the guide member thereof mating with the longitudinal guide such that the guided gear moves along the roller drive shaft when the transporter drive assembly moves the cartridge transporter, and a roller driver that includes a stepper motor rotatably coupled to the roller drive shaft;

wherein the control circuit calculates a position of the cartridge within the cartridge passage by counting a first number of steps that the stepper motor has rotated the roller drive shaft since the first roller began moving the cartridge from one of the mailbox slots and into the cartridge transporter;

wherein the control circuit calculates that the cartridge has been fully inserted into one of the mailbox slots by counting a second number of steps that the stepper motor has rotated the roller drive shaft with respect to the optical beam first being broken by the cartridge as the first roller moves the cartridge from the cartridge transporter into the mailbox slot; and wherein the control circuit compensates for backlash of the intercoupled gears by including a respective backlash-compensation number in the first and second numbers.

22. A library for storing a cartridge of data-storage media, comprising:

a chassis having a front, rear, and opposing sides extending at least partially between the front and rear of the chassis;

a mailbox disposed within and at the front of the chassis, the mailbox having mailbox slots, each of the slots having a front slot opening that faces toward the front of the chassis and a rear slot opening that faces toward the rear of the chassis, each of the slots constructed to allow insertion and removal of the cartridge through both of the front and rear slot openings thereof;

a media drive disposed within the chassis and spaced from the mailbox toward the rear of the chassis, the media drive having a drive opening that faces the front of the chassis, the media drive operable to receive and eject the cartridge through the drive opening;

a cartridge transporter disposed within the chassis between the mailbox and the media drive, the cartridge transporter having a first transporter opening that faces the front of the chassis, a second transporter opening that faces the rear of the chassis, and a cartridge passage that extends between the first and second transporter openings;

a transporter drive assembly disposed within the chassis, coupled to the cartridge transporter, and operable to move the cartridge transporter to align the first transporter opening with the rear slot opening of a selected mailbox slot and to align the second transporter opening, with the drive opening of the media drive;

a first roller arm mounted to the cartridge transporter at a side thereof toward the first transporter opening and having a first roller;

a second roller arm mounted to the cartridge transporter at a side thereof toward the second transporter opening and having a second roller;

a roller mechanism mounted to the cartridge transporter and operable to move the cartridge through the cartridge passage, the roller mechanism including, the first and second rollers and at least one passage roller positioned within the cartridge passage;

a roller drive assembly disposed within the chassis and coupled to and operable to rotatably drive the passage and first and second rollers;

a cam mechanism mounted to the cartridge transporter and operable to move the first and second roller arms into and out of engagement with the cartridge;

a cam drive assembly disposed within the chassis and coupled to the cam mechanism, the cam drive assembly being operable to move the cam mechanism to cause the first roller arm to engage the cartridge as the first roller moves the cartridge between the cartridge transporter and the selected mailbox slot, and operable to move the cam mechanism to cause the second roller arm to engage the cartridge as the second roller moves the cartridge between the cartridge transporter and the media drive;

a control circuit coupled to the transporter, roller, and cam drive assemblies and operable to control the same; and an optical cam-position sensor coupled to the control circuit and operable to generate an optical beam;

wherein the cartridge transporter has a beam opening that is aligned with the sensor and that allows the optical beam to pass therethrough;

wherein the cam mechanism comprises, cams operable to engage the first and second roller arms, and intercoupled gears that are operable to transfer rotational motion thereof to the cams, a first one of the gears having a guide member, a second one of the gears having a reference opening that is aligned with the beam opening of the cartridge transporter when the cam mechanism is in a reference position;

wherein the cam drive assembly comprises, a cam shaft with a longitudinal guide and that extends through the guided gear with the guide member thereof mating with the longitudinal guide such that the guided gear moves along the cam shaft when the transporter assembly moves the cartridge transporter, and a stepper motor that is coupled to the cam shaft; and wherein the control circuit determines that the cam mechanism is in the reference position when the optical beam is unbroken, determines another position of the cam mechanism by counting a first number of steps that the stepper motor moves the cam shaft with respect to the reference position, and accounts for backlash between the intercoupled gears by including a backlash-compensation number in the first number.

23. A library for storing a cartridge of data-storage media, comprising:

a chassis having a front, rear, and opposing sides extending at least partially between the front and rear of the chassis;

a mailbox disposed within and at the front of the chassis, the mailbox having mailbox slots, each of the slots having a front slot opening that faces toward the front of the chassis and a rear slot opening that faces toward the rear of the chassis, each of the slots constructed to allow insertion and removal of the cartridge through both of the front and rear slot openings thereof;

a media drive disposed within the chassis and spaced from the mailbox toward the rear of the chassis, the media drive having a drive opening that faces the front of the chassis, the media drive operable to receive and eject the cartridge through the drive opening;

a cartridge transporter disposed within the chassis between the mailbox and the media drive, the cartridge transporter having a first transporter opening that faces the front of the chassis, a second transporter opening that faces the rear of the chassis, and a cartridge passage that extends between the first and second transporter openings;

a transporter drive assembly disposed within the chassis, coupled to the cartridge transporter, and operable to move the cartridge transporter to align the first transporter opening with the rear slot opening of a selected mailbox slot and to align the second transporter opening with the drive opening of the media drive;

a first roller arm mounted to the cartridge transporter at a side thereof toward the first transporter opening and having a first roller;

a second roller arm mounted to the cartridge transporter at a side thereof toward the second transporter opening and having a second roller;

a roller mechanism mounted to the cartridge transporter and operable to move the cartridge through the cartridge passage, the roller mechanism including the first and second rollers and at least one passage roller positioned within the cartridge passage;

a roller drive assembly disposed within the chassis and coupled to and operable to rotatable drive the passage and first and second rollers;

a cam mechanism mounted to the cartridge transporter and operable to move the first and second roller arms into and out of engagement with the cartridge;

a cam drive assembly disposed within the chassis and coupled to the cam mechanism, the cam drive assembly being operable to move the cam mechanism to cause the first roller arm to engage the cartridge as the first roller moves the cartridge between the cartridge transporter and the selected mailbox slot, and operable to move the cam mechanism to cause the second roller arm to engage the cartridge as the second roller moves the cartridge between the cartridge transporter and the media drive;

a control circuit coupled to the transporter, roller, and cam drive assemblies and operable to control the same; and an optical transporter-position sensor coupled to the control circuit and operable to generate an optical beam;

wherein the cartridge transporter includes a protrusion that interrupts the optical beam when the cartridge transporter is in a reference position;

wherein the transporter drive assembly comprises a guide shaft that extends through the cartridge transporter, a belt assembly having the cartridge transporter attached thereto and that is operable to move the cartridge transporter along the shaft, and a belt drive assembly that includes a stepper motor coupled to the belt assembly; and wherein the control circuit determines that the cartridge transporter is in the reference position when the optical beam is broken, determines another position of the cartridge transporter by counting a first number of steps that the stepper motor moves the belt assembly with respect to the reference position, and accounts for backlash in the belt assembly by including a backlash-compensation number in the first number.

24. A method of moving a cartridge between a slot of a storage library and a drive opening of a media drive of the storage library, the method comprising:

controlling a cam mechanism to open a first roller arm on an end of a cartridge transporter facing the slot;

aligning the cartridge transporter with the slot by:
moving the cartridge transporter to a home position;
moving the cartridge transporter with a stepper motor a first predetermined number of motor steps from the home position to a first position to compensate for backlash; and
moving the cartridge transporter with the stepper motor a second predetermined number of motor steps from the first position to align the cartridge transporter with the slot;

controlling the cam mechanism to close the first roller arm so that a first roller engages the cartridge;

activating the first roller to move the cartridge from the slot and into the cartridge transporter;

deactivating the first roller when the cartridge is fully within the cartridge transporter;

controlling the cam mechanism to open a second roller arm on an end of the cartridge transporter facing the media drive;

aligning the cartridge transporter with the drive opening of the media drive;

controlling the cam mechanism to close the second roller arm so that a second roller engages the cartridge; and activating the second roller to move the cartridge from the cartridge transporter into the media drive.

25. The method of claim 24 wherein activating the first roller comprises:
engaging the cartridge with the first roller and with a passage roller positioned within a passage of the cartridge transporter; and
rotating the first and passage rollers with a stepper motor a predetermined number of motor steps to move the cartridge fully within the cartridge transporter.

26. The method of claim 24 wherein activating the first roller comprises:
engaging the cartridge with the first roller and with a passage roller positioned within a passage of the cartridge transporter;
rotating the first and passage rollers with a stepper motor a first predetermined number of steps after engaging the cartridge to compensate for backlash in roller gears that drive the first and passage rollers; and
rotating the first and passage rollers with the stepper motor a second predetermined number of steps after rotating the first predetermined number of steps to move the cartridge fully within the cartridge transporter.

27. The method of claim 24, further comprising, after aligning the cartridge transporter with the slot and before controlling the cam mechanism to close the first roller arm, releasing a latch that when unreleased, prevents the cartridge from being moved out of the slot in a direction toward the cartridge transporter.

28. The method of claim 24, further comprising, before controlling the cam mechanism to close the first roller arm, closing a door having a protrusion that pushes the cartridge fully into the slot as the door closes.

29. The method of claim 24, further comprising, after activating the second roller to move the cartridge from the cartridge transporter into the media drive:
moving the cartridge transporter such that a push cam disposed thereon is aligned with the drive opening of the media drive; and
controlling the cam mechanism such that the push cam pushes the cartridge a remaining way into the media drive.

30. A method of moving a cartridge between a slot of a storage library and a drive opening of a media drive of the storage library, the method comprising:
controlling a cam mechanism to open a first roller arm on an end of a cartridge transporter facing the slot by;
moving the cam mechanism into a home position;
moving the cam mechanism with a stepper motor a first predetermined number of motor steps from the home position to a first position to compensate for backlash; and moving the cam mechanism a second predetermined number of steps from the first position to open the first roller arm;

aligning the cartridge transporter with the slot;

controlling the cam mechanism to close the first roller arm so that a first roller engages the cartridge;

activating the first roller to move the cartridge from the slot and into the cartridge transporter;

deactivating the first roller when the cartridge is fully within the cartridge transporter;

controlling the cam mechanism to open a second roller arm on an end of the cartridge transporter facing the media drive;

aligning the cartridge transporter with the drive opening of the media drive;

controlling the cam mechanism to close the second roller arm so that a second roller engages the cartridge; and activating the second roller to move the cartridge from the cartridge transporter into the media drive.

\* \* \* \* \*

UNITED STATES PATENT AND TRADEMARK OFFICE
CERTIFICATE OF CORRECTION

PATENT NO. : 6,198,984 B1
DATED : March 6, 2001
INVENTOR(S) : Nathan H. Searle and Allen E. Fleckenstein It is certified that error appears in the above-identified patent and that said Letters Patent is hereby corrected as shown below:

Claim 22, column 19,
Line 39, "opening, with the" should read -- opening with the --.
Line 49, "mechanism including, the" should read -- mechanism including the --.

Claim 23, column 21,
Line 11, "operable to rotatable drive" should read -- operable to rotatably drive --.

Signed and Sealed this

Eleventh Day of September, 2001

*Attest:*

NICHOLAS P. GODICI
*Attesting Officer*    *Acting Director of the United States Patent and Trademark Office*